United States Patent
Takahashi et al.

(10) Patent No.: US 8,004,554 B2
(45) Date of Patent: Aug. 23, 2011

(54) PLASTIC OPTICAL ELEMENT, OPTICAL SCANNING DEVICE, AND IMAGE FORMING APPARATUS USING THE OPTICAL SCANNING DEVICE

(75) Inventors: Go Takahashi, Ebina (JP); Eiichi Hayashi, Atsugi (JP); Kan Aoki, Yamato (JP); Masafumi Furusawa, Atsugi (JP); Takamichi Ohhashi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 12/507,600

(22) Filed: Jul. 22, 2009

(65) Prior Publication Data
US 2010/0054809 A1 Mar. 4, 2010

(30) Foreign Application Priority Data

Sep. 1, 2008 (JP) ................................. 2008-223630
Jan. 28, 2009 (JP) ................................. 2009-016169

(51) Int. Cl.
*B41J 15/14* (2006.01)
*B41J 27/00* (2006.01)
(52) U.S. Cl. ........................................ 347/244; 347/258
(58) Field of Classification Search .................. 347/230, 347/241, 244, 256, 258
See application file for complete search history.

(56) References Cited

U.S. PATENT DOCUMENTS

| 6,015,514 | A | 1/2000 | Koseko |
| 6,620,486 | B2 * | 9/2003 | Kanematsu et al. ........... 428/156 |
| 2006/0262372 | A1 | 11/2006 | Hayashi |
| 2007/0216983 | A1 | 9/2007 | Hayashi et al. |
| 2008/0049287 | A1 | 2/2008 | Kimura et al. |
| 2009/0073580 | A1 | 3/2009 | Hayashi et al. |

FOREIGN PATENT DOCUMENTS

| JP | 11-028745 | 2/1999 |
| JP | 2000-329908 | 11/2000 |
| JP | 2000329908 A * | 11/2000 |
| JP | 2002326260 A * | 11/2002 |
| JP | 2007-133179 | 5/2007 |

* cited by examiner

*Primary Examiner* — Hai C Pham
(74) *Attorney, Agent, or Firm* — Dickstein Shapiro LLP

(57) ABSTRACT

A plastic optical element for guiding a scanned light beam in a main scanning direction and a sub-scanning direction, which is prepared by a molding method using a die. The element includes: a main body including at least two optically functional surfaces, which are transfer surfaces formed by contacted with transfer surfaces of the die and through which the light beam passes; and at least two ribs located on surfaces of the main body other than the optically functional surfaces and extending in parallel in the main scanning direction. A recessed portion is present on a surface of at least one of the ribs, and the recessed portion has a side transfer surface and a bottom surface, which is a non-transfer surface, and the distance between the optically functional surfaces is less than the length of the main body in the sub-scanning direction.

10 Claims, 21 Drawing Sheets

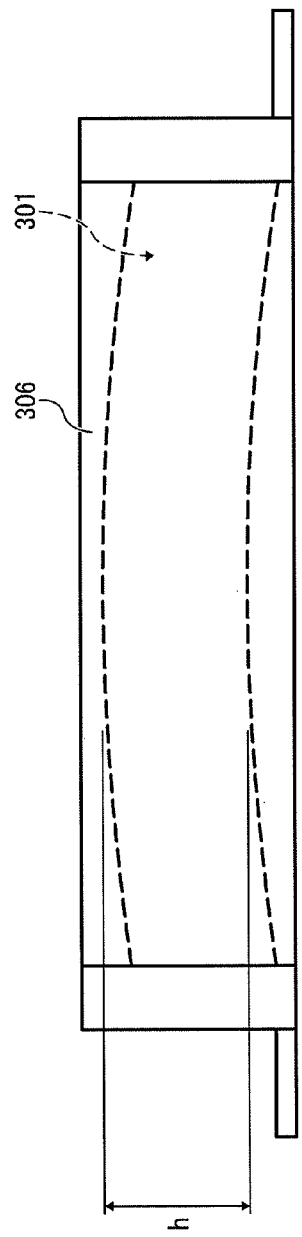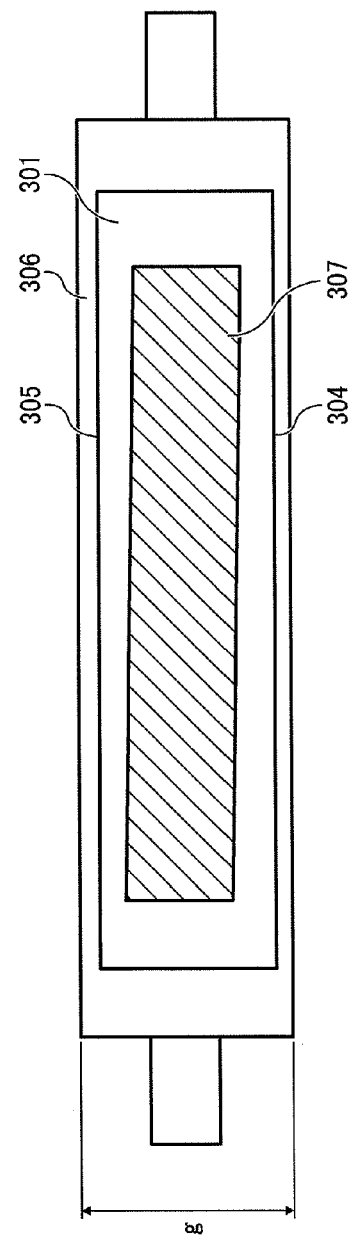

SUB-SCANNING DIRECTION

PLASTIC OPTICAL ELEMENT, OPTICAL SCANNING DEVICE, AND IMAGE FORMING APPARATUS USING THE OPTICAL SCANNING DEVICE

BACKGROUND OF THE INVENTION

1. Field of the Invention

The present invention relates to a plastic optical element for use in optical scanning devices, which are used for image forming apparatus and optical apparatus. In addition, the present invention relates to an optical scanning device using the plastic optical element, and an image forming apparatus using the optical scanning device.

2. Discussion of the Related Art

Recently, in order to fulfill a need for producing high resolution full color images at a high speed, color image forming apparatus such as digital copiers and laser printers using a tandem optical device have been developed and commercialized. In such color image forming apparatus, plural (four) light beams irradiate plural (four) photoreceptors, which are arranged side by side in the receiving material feeding direction, at the same time to form electrostatic latent images on the photoreceptors. The electrostatic latent images on the photoreceptors are developed by the respective developing devices using different color developers (such as yellow, magenta, cyan and black color developers) to form visual color images (such as toner images) on the respective photoreceptors. The color images are transferred one by one on a receiving material optionally via an intermediate transfer medium to form a color image (such as full color images) on the receiving material.

Such image forming apparatus typically include plural optical scanning devices emitting respective light beams.

Such optical scanning devices typically use rectangular optical elements, which focus laser beams and perform various correction functions. Recently, in order to reduce costs of the optical elements, the material constituting the elements is changed from glass to plastics. In addition, in order to impart various functions to one optical element, the surface is changed from the spherical surface to non-spherical surface. For example, lenses, which have a large thickness and whose thickness is not even in the longitudinal direction thereof are typically used as optical elements.

An optical scanning device (and method) is proposed, in which plural light beams emitted by a light source are guided to one deflector to be scanned, and the scanned light beams are guided to respective focusing devices to focus the light beams on the respective photoreceptors. Each of the focusing devices includes a plastic optical element, and the focusing device, the light source, the incident optical system receiving the light beams emitted by the light source, and the deflector deflecting the light beams exited from the incident optical system are contained in a housing.

Molding methods such as gate seal molding methods and re-melt molding methods have been conventionally used for producing plastic optical elements. The purpose of using such molding methods is to prepare a plastic element with high dimensional precision while reducing internal strain to improve the precision of the resultant element. Specifically, after a resin is contained in a die, the resin is heated to a temperature not lower than the glass transition temperature of the resin and the temperature and pressure of the resin in the die are controlled to be constant. The resin is then gradually cooled to a temperature not higher than the thermal deformation temperature of the resin, and is released from the die, resulting in formation of a molded plastic element.

Although a plastic material with high dimensional precision can be prepared by using these molding methods, the molding time of the methods is much longer than that of injection molding methods in which the temperature of the die is maintained to be constant because it takes a long time to raise and drop the temperature of the die. Therefore, the molding methods have low productivity.

In contrast, a surface sink control molding method utilizing the high productivity of the injection molding method is disclosed in a Japanese patent No. 3,512,595 (i.e., published unexamined Japanese patent application No. (JP-A) 11-028745 corresponding to U.S. Pat. No. 6,015,514). In this method, a resin is contained in a die whose temperature is controlled to be not higher than the glass transition temperature of the resin while controlling a sink occurring in the molding process such that the sink does not affect the properties and dimensional precision of a functional surface (hereinafter sometimes referred to as transfer surface) of the resultant optical plastic element. In this method, in order to prevent occurrence of a sink on a transfer surface due to shrinkage of the molded resin, a surface (hereinafter sometimes referred to as imperfect transfer surface) of the molded resin other than the transfer surface is separated from a surface of the die so that shrinkage of the resin occurs at the imperfect transfer surface (i.e., shrinkage does not occur at the transfer surface) in the cooling process.

By using this surface sink control molding method, a plastic element with large thickness and/or uneven thickness can be molded at the same molding time as that of conventional injection molding methods without performing gradual cooling. In addition, the dimensional precision and internal strain of the resultant plastic element are as good as those of plastic elements molded by the above-mentioned molding methods performing gradual cooling. Further, since sinks can be certainly caused only on the imperfect transfer surfaces of the plastic element, the transfer surface of the plastic element has high dimensional precision. By using this surface sink control molding method, a plastic element having high molding stability can be prepared with little dependence on the pressure in the molding process.

The surface sink control molding method is effective for molding plastic elements such as fθ lenses which are thick in the light beam transmission direction. However, there are long plastic elements, which, unlike such fθ lenses, have a thickness (lens thickness (a) illustrated in FIG. 2B) in the light beam transmission direction smaller than the width (i.e., lens width (b) illustrated in FIG. 2B) in the sub-scanning direction. When the surface sink control molding method is used for molding such a long plastic element, a problem tends to occur. Specifically, since the cooling speed of the lens thickness direction is faster than the lens width direction in the cooling process, shrinkage of the long plastic element in the lens thickness direction becomes large, and thereby a sink is easily formed on the transfer surface of the long plastic element.

In attempting to solve the problem, JP-A 2007-133179 discloses a technique such that a projected portion is formed on another transfer surface of the plastic element, which is different from the transfer surface to be used as an optically functional surface, to increase the mold-releasing resistance of the element so that the sink does not enter into the reference surface of the plastic element, on the basis of which the plastic element is attached to a member.

Thus, when molding long plastic elements, it is necessary to sink an imperfect surface thereof more effectively than in the case of thick plastic elements (such as fθ lenses) so that the transfer surface (i.e., optically functional surface) thereof is formed with high precision.

Long plastic optical elements typically have a rib with thickness of few millimeters around the optically functional surface to increase the mechanical strength thereof, thereby preventing deformation of the elements even when receiving external forces. When an imperfect surface is formed on one side of the rib, the distance between the optically functional surface and the imperfect surface increases by the thickness of the rib. Therefore, a problem in that the effect of preventing formation of a sink on the optically functional surface by forming a sink on the imperfect surface is hardly produced occurs.

As mentioned above, by inserting a resin into a cavity of a die or by injecting a melted resin in to a cavity, plastic optical elements can be mass-produced at relatively low costs even when the optical elements have special shapes.

In the cooling process of such conventional molding methods, it is preferable to control the pressure and temperature of the resin in the cavity of the die so as to be even to produce a plastic element, which has a desired shape and high dimensional precision. In the case of a long plastic lens disclosed in JP-A 2007-133179, which has uneven thickness, volume shrinkage of portions of the lens is different depending on the thickness of the portions, resulting in deterioration of dimensional precision of the lens. In addition, a sink tends to be formed on a relatively thick portion of the lens.

In this regard, when increasing the pressure of the injected resin (i.e., by increasing the amount of the injected resin) in an injection molding method to solve this problem, the internal strain of the resultant plastic element increases. Particularly, when the plastic element is a thick optical element having uneven thickness, the internal strain seriously increases, thereby affecting the optical properties of the plastic element.

Namely, when the pressure of the injected resin is decreased (i.e., the amount of the injected resin is decreased) to decrease the internal strain of the molded plastic element, a problem in that a sink is formed on thick portions of the element occurs. In contrast, when the pressure of the injected resin is increased (i.e., the amount of the injected resin is increased) to prevent formation of a sink on the plastic element, a problem in that the plastic element has large internal strain occurs.

In attempting to solve the problems, JP-A 2000-329908 proposes a technique such that, as illustrated in FIGS. 3 and 4 thereof, a recessed portion (i.e., an imperfect transfer portion) is formed on a surface other that the transfer surface (i.e., optically functional surface) of the plastic element.

Particularly in a case of long plastic element in which a ratio (g/h) of the length (illustrated by a character (g) in FIG. 13B) of the element in the sub-scanning direction to the thickness (illustrated by a character (h) in FIG. 13A) of the lens portion is greater than 1, the cooling speed (i.e., thermal shrinkage) of the lens portion (i.e., a portion 301 in FIG. 13A) is faster than the other portions of the element, and thereby a sink is easily formed on the surface of the lens portion.

A long plastic lens is illustrated in FIG. 11.

Referring to FIG. 11, numeral 301 denotes the main body (i.e., lens portion) of the plastic lens, and numerals 302 and 303 respectively denote the entrance surface which is one of transfer surfaces and from which a light beam (incident light) enters, and the exit surface which is also one of transfer surfaces and from which the light beam exits. When the plastic lens is used for an optical scanning device, the plastic lens is set in such a manner that the longitudinal direction of the lens is identical to the main scanning direction of the optical scanning device as illustrated in FIG. 11.

FIG. 12 illustrates the entire of the plastic lens. Specifically, a rib 306 is formed on each of side surfaces 304 and 305 of the main body 301, which are different from the transfer surfaces 302 and 303. In addition, another rib (second rib) can be formed on each of the other side surfaces (i.e., the end surfaces in the main scanning direction), which are perpendicular to the side surfaces 304 and 305, although the second rib is not illustrated in FIG. 12. These ribs are molded while integrated with the main body 301 and made of the same material as that of the main body.

FIGS. 13A and 13B illustrate the plastic lens observed from directions S and R (illustrated in FIG. 12), respectively. In this regard, the direction R is the light entrance direction. In FIG. 13B, numeral 307 denotes the light transmission region of the lens, through which a light beam passes. FIG. 14 illustrates the cross section of the plastic lens when the lens is cut by a line C-C illustrated in FIG. 12 (i.e., when the lens is cut at any point thereof in the main scanning direction (x)).

JP-A 2000-329908 discloses a technique in that a recessed portion (i.e., an imperfect transfer portion) is formed on at least one of the ribs (e.g., ribs 306 in FIG. 14) to prevent occurrence of the sink problem even when the molded material is a long plastic lens having a ratio (g/h) of greater than 1 and the injection pressure is relatively low (i.e., the amount of the injected resin is relatively small).

However, even when this technique is used, the following problem tends to occur. Specifically, as mentioned below in detail, a problem in that since the length (g) of the lens in the sub-scanning direction is greater than the thickness (h) thereof, the surface 303 of the lens is slanted in the sub-scanning direction (as illustrated in FIG. 23), resulting in deterioration of precision of the lens occurs depending on the conditions of the formed recessed portion (i.e., imperfect transfer portion). In addition, when the slanting degree is different in the main scanning direction of the lens, the lens is twisted in the sub-scanning direction, resulting in distortion of the lens, thereby producing large variation of positions of light spots formed by scanning of light beams passing the lens.

Variation of positions of light spots, particularly, variation of positions of high frequency component, in an optical scanning device including such a lens and used for color image forming apparatus causes a color misalignment problem in that two or more color images are over laid while mis-aligned, resulting in formation of color images with poor color reproducibility. In this regard, the high frequency component means the residual component determined by subtracting the secondary component from the scanning position, and is an important factor in the qualities (such as color misalignment) of color images. This problem becomes remarkable recently because the recent image forming apparatus are desired to produce high resolution images.

Because of these reasons, a need exists for a molding method by which a long plastic optical element having an optically functional surface with high precision can be produced at relatively low costs even when the thickness of the element is smaller than the length thereof in the sub-scanning direction.

SUMMARY OF THE INVENTION

As an aspect of the present invention, a plastic optical element for guiding a scanned light beam in a main scanning direction and a sub-scanning direction is provided. The plastic optical element is prepared by a molding method using a die. The plastic optical element includes:

a main body including at least two optically functional surfaces, which are transfer surfaces formed by contacting with transfer surfaces of the die and which include:

a light entrance surface from which the light beam enters; and a light exit surface from which the light beam exits; and at least two ribs located on surfaces of the main body other than the at least two optically functional surfaces and extending in parallel in the longitudinal direction (i.e., the main scanning direction) of the main body, where in a recessed portion is present on a surface of at least one of the at least two ribs, and wherein the recessed portion has a side surface, which is a transfer surface, and a bottom surface, which is a non-transfer surface formed without contacting a transfer surface of the die, wherein the distance between the two optically functional surfaces of the main body (i.e., the thickness of the main body) is less than the length of the main body in the sub-scanning direction.

As another aspect of the present invention, an optical scanning device is provided, which includes:

a light source configured to emit a light beam;

a light deflector configured to deflect the light beam; and a focusing optical system configured to focus the deflected light beam on a member while scanning the member with the deflected light beam, wherein the focusing optical system includes the above-mentioned plastic optical element.

As yet another aspect of the present invention, an image forming apparatus is provided, which includes:

at least one image bearing member configured to bear an electrostatic image thereon;

the above-mentioned optical scanning device configured to focus the light beam on the at least one image bearing member while scanning the image bearing member with the light beam to form the electrostatic image on a surface of the image bearing member.

As a further aspect of the present invention, a method for preparing the plastic optical element is provided. The method includes:

injecting a resin heated to a temperature not lower than a softening point of the resin into a cavity of a die, which has at least two transfer surfaces and which is heated to a temperature lower than the softening point;

applying a pressure to the cavity (resin) so that the injected resin is pressure-contacted with transfer surfaces of the die and has at least two transfer surfaces and at least two ribs; and cooling the injected resin without contacting at least one surface of the at least two ribs with a transfer surface of the die to form a recessed portion on the at least one surface of the at least two ribs.

These and other objects, features and advantages of the present invention will become apparent upon consideration of the following description of the preferred embodiments of the present invention taken in conjunction with the accompanying drawings.

BRIEF DESCRIPTION OF THE DRAWINGS

FIGS. 12 and 13 illustrate the entire of a background long plastic optical element having two ribs;

DESCRIPTION OF THE PREFERRED EMBODIMENTS

An example of the plastic optical element of the present invention will be explained by reference to drawings.

Figure 2A:
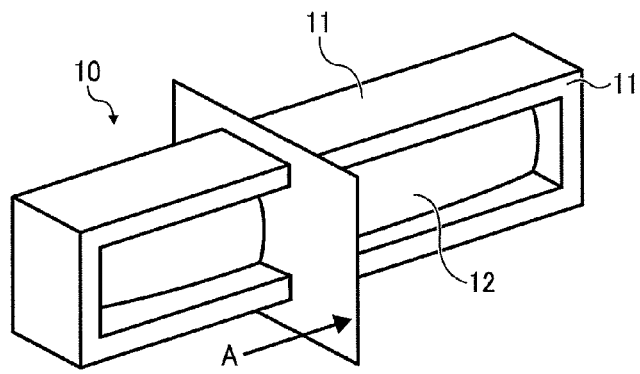
Figure 2B:
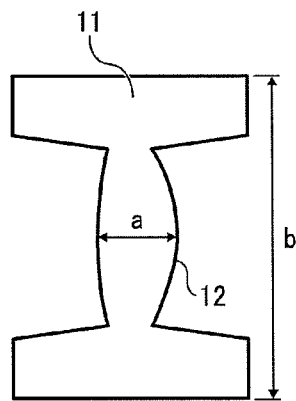

The plastic optical element of the present invention is a plastic optical element in which the thickness (represented by character (a) in FIG. 2B) of the element in the light beam transmission direction is smaller than the length (represented by character (b) in FIG. 2B) of the element in the sub-scanning direction. The plastic optical element is prepared by feeding a resin into the cavity of a die having transfer surfaces and then applying a pressure to the cavity so that the resin is pressure-contacted with the transfer surfaces of the die. The plastic optical element has a main body including at least one optically functional surface (preferably two optically functional surfaces), which is transfer surface formed by contacting with a transfer surface of the die; and at least one rib located on a surface of the main body other than the optically functional surface (preferably two ribs on surfaces of the main body other than the optically functional surfaces) and extending in the longitudinal direction of the main body (i.e., the main scanning direction). In addition, a recessed portion is present on a surface of the at least one rib, and the recessed portion has a bottom surface, which is an imperfect surface (sometimes referred to as a non-transfer surface) formed without contacting the resin with a transfer surface of the die. Alternatively, two ribs are formed so as to be parallel to the longitudinal direction of the main body and perpendicular to the optically functional surface of the main body, and a recessed portion is formed on a surface of at least one of the ribs.

Figure 1:
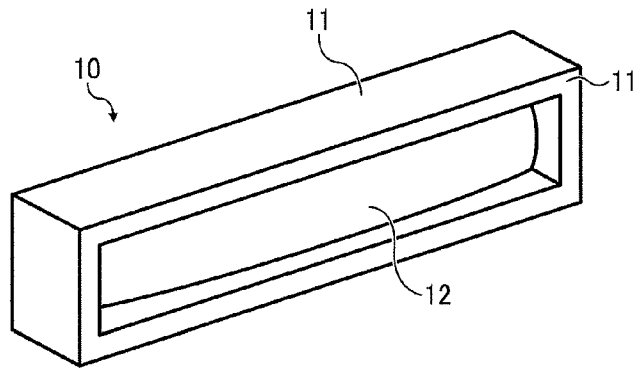
FIGS. 1-2 are views illustrating a background long plastic optical element.

FIG. 1 is a perspective view illustrating a background long plastic optical element. A plastic optical element 10 includes a main body having an optically functional surface 12 and a rib 11. The cross section (i.e., cross section at any point in the main scanning direction) of the plastic optical element obtained by cutting the element at a plane A (illustrated in FIG. 2A) is illustrated in FIG. 2B. As illustrated in FIG. 2B, the thickness (a) of the element in the light beam transmission direction is less than the length (b) of the element in the sub-scanning direction. When preparing such a plastic optical element using a die, the cooling speed of the molded element in the light beam transmission direction is faster than the other portions thereof. Therefore, the thermal shrinking force in the light beam transmission direction is large. Accordingly, a sink tends to be easily formed on the optically functional surface of the element. Therefore, it is necessary to efficiently form a sink on an imperfect surface (non-transfer surface) of the molded plastic optical element while transferring the transfer surface of the die to the element so that a sink is not formed on the transfer surface and the optically functional surface of the element has good precision.

Next, the shrinking force generating in a molded resin for a background plastic optical element when the molded resin is cooled in the die will be explained by reference to FIGS. 3 and 4.

Figure 3:
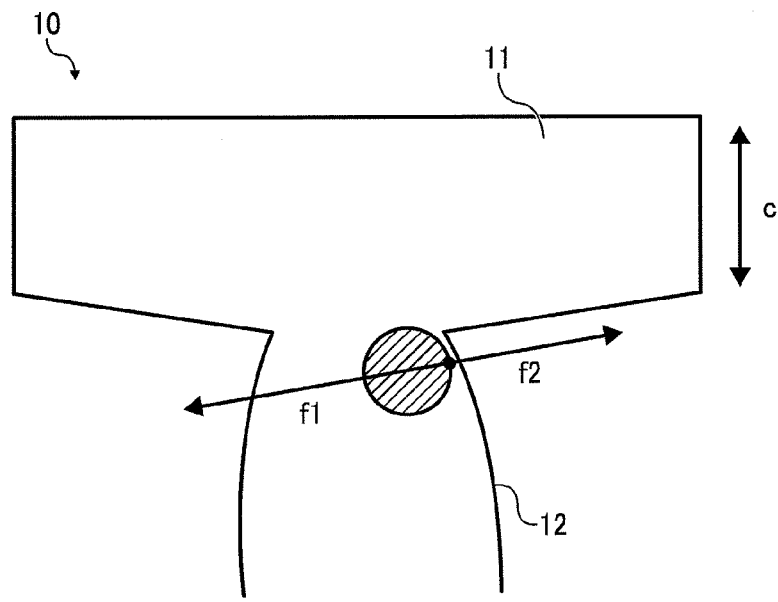
FIG. 3 is a view for explaining the shrinking force generated in the background long plastic optical element in a molding process.
Figure 4:
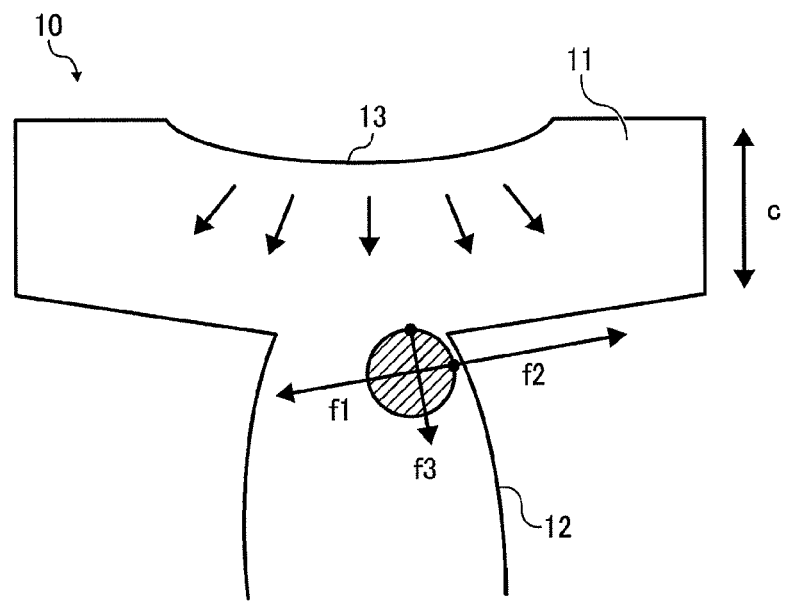
FIG. 4 is a view for explaining the shrinking force generated on a non-transfer surface of the background long plastic optical element in a molding process.

In the cooling process in which the molded resin is cooled in the die, a shrinking force operates in a shaded circular portion illustrated in FIG. 3. When a force f1, which is a force of the resin in such a direction that the resin releases from the die, is greater than a transfer force of the resin, i.e., a force f2, which is a force of the resin in such a direction that the resin keeps adhering to the die, the resin is released from the die, resulting in formation of a sink on a surface of the transfer surface 12 (i.e., optically functional surface).

A background sink controlling method will be explained by reference to FIG. 4. In the molded resin illustrated in FIG. 4, the resin in the surface portion of the rib 11 (i.e., the resin in the vicinity of the imperfect surface) has a high temperature and high fluidity state. Therefore, when a shrinking force is generated in the vicinity of the optically functional surface 12 as illustrated in FIG. 3, the resin on the imperfect surface side shrinks by priority as illustrated in FIG. 4, in which numeral f3 denotes the shrinking force, thereby forming a recessed portion having a non-transfer surface 13 and decreasing the releasing force f1. Therefore it may be possible to prevent formation of a sink at the optically functional surface 12.

However, the rib 11 of the plastic optical element typically has a thickness (c) of about few millimeters in order to strengthen the optical element, i.e., to prevent deformation of the optical element. Therefore, the distance between the imperfect surface of the rib 11 and the optically functional surface 12 is considerably long. Namely, the distance is too long to prevent formation of a sink on the optically functional surface 12.

Figure 5:
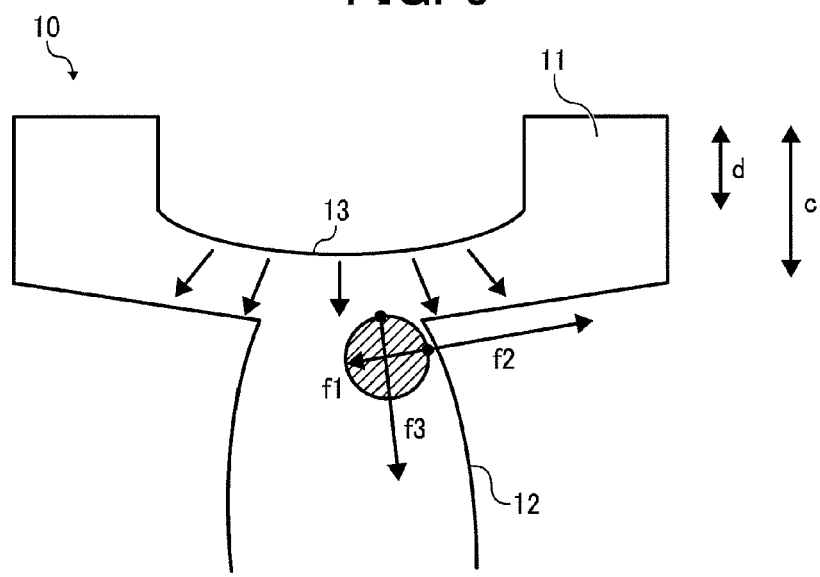
FIG. 5 is a view for explaining the shrinking force generated in an example of the plastic optical element of the present invention in a molding process.

In order to prevent formation of a sink on the optically functional surface 12, as illustrated in FIG. 5, the plastic optical element of the present invention preferably has a relatively deep recessed portion on the surface of the rib 11, which portion has a depth (d). The bottom of the recessed portion has the non-transfer surface 13 formed by imperfect transferring, i.e., imperfect contact of the resin with a wall of the die used.

By forming such a recessed portion having a depth (d) on the surface of the rib 11, the distance between the imperfect surface 13 and the optically functional surface 12 can be shortened by the distance (d) with hardly deteriorating the mechanical strength of the optical element, and thereby the effect of preventing formation of a sink on the optically functional surface 12 can be enhanced. Therefore, a good optically functional surface can be formed by performing transferring without forming a sink thereon, resulting in formation of an optically functional surface having good dimensional precision. Therefore, the optical element has good optical properties.

Figure 6:
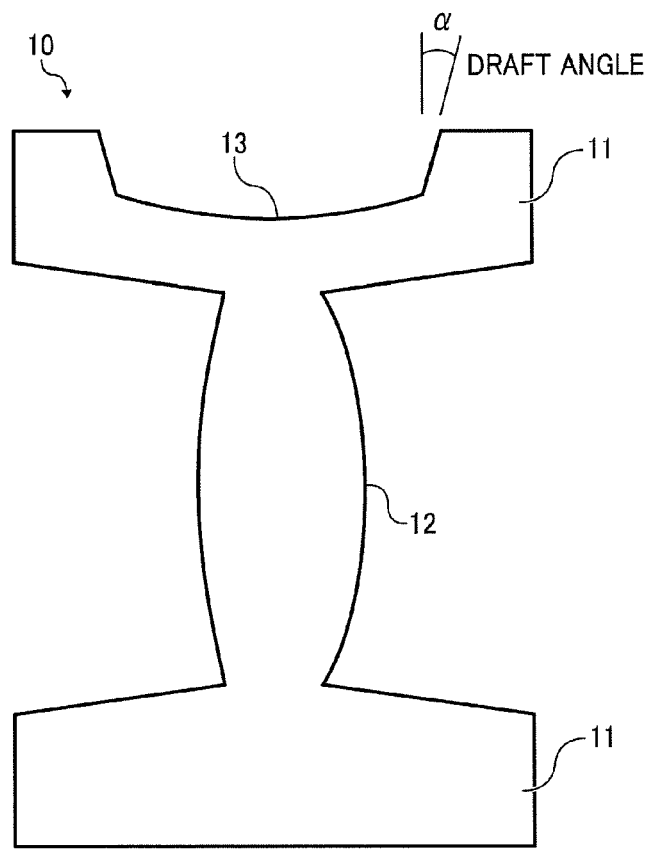
FIG. 6 is a cross-sectional view illustrating another example of the plastic optical element of the present invention.

As illustrated in FIG. 6, the side walls of the recessed portion preferably have a draft angle α so that the molded optical element can be easily released from the die. When the side walls of the recessed portion of the molded optical element have a draft angle α, the resistance to releasing from the die can be decreased because friction between the molded element and the die can be decreased. Therefore, the burden to the plastic optical element in the releasing process in which the element is released from the die can be reduced, thereby preventing deformation of the optical element. Therefore, the resultant optical element has good optical properties, i.e., the optically functional surface has high dimensional precision.

Figure 7:
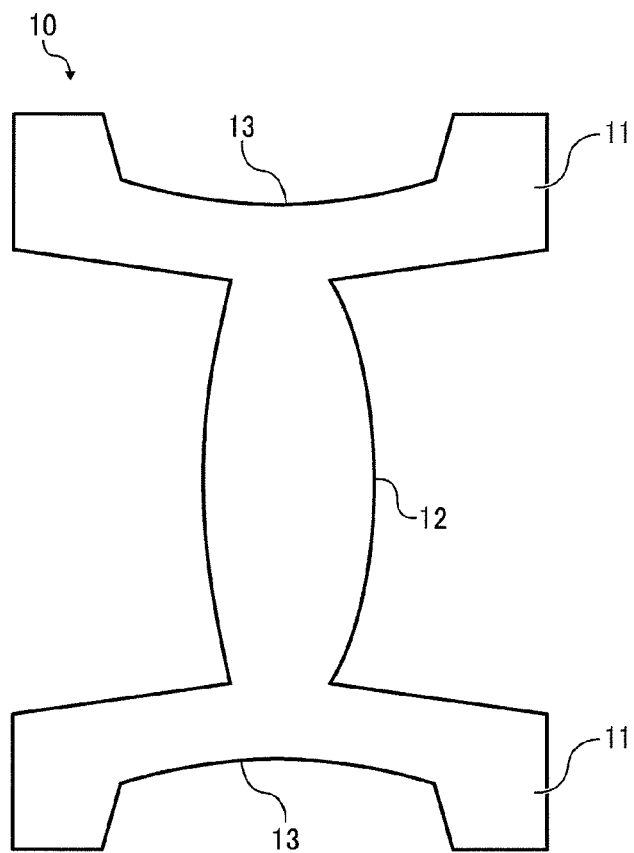
FIG. 7 is a cross-sectional view illustrating another example of the plastic optical element of the present invention.

As illustrated in FIG. 7, the plastic optical element of the present invention preferably has a recessed portion on each of the surfaces of the ribs 11.

Figure 8:
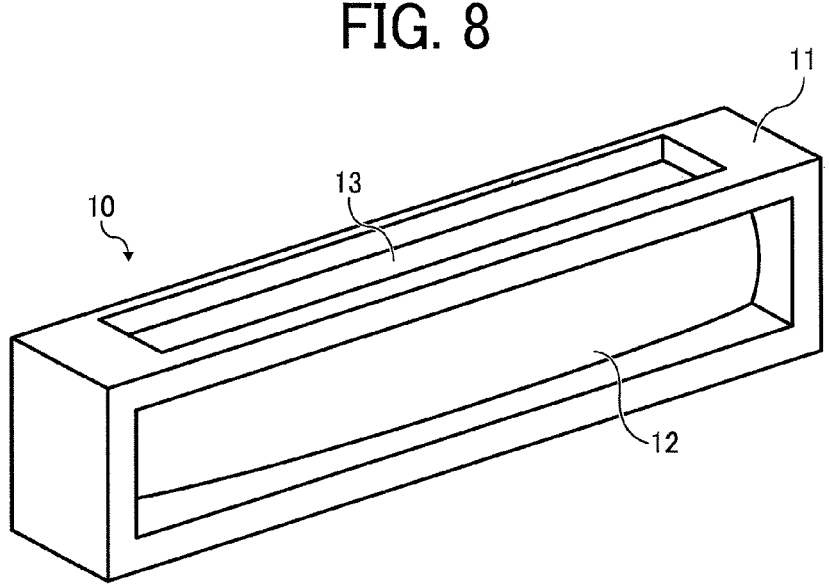
FIG. 8 is a perspective view illustrating another example of the plastic optical element of the present invention.

FIG. 8 is a perspective view illustrating an example of the plastic optical element of the present invention, which has a recessed portion having a non-transfer surface 13.

The plastic optical element of the present invention preferably made of a transparent resin.

Next, the optical scanning device and image forming apparatus of the present invention, which includes the above-mentioned plastic optical element of the present invention will be explained.

Figure 9:
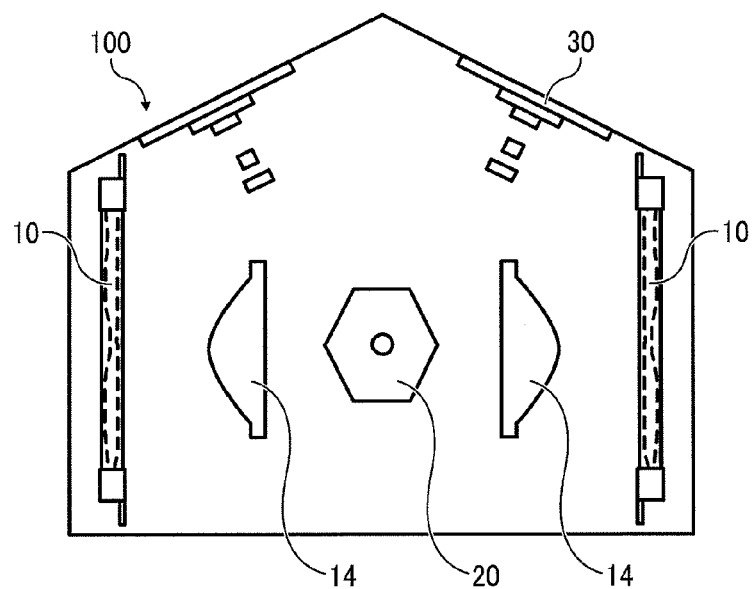
FIG. 9 is a schematic view illustrating an example of the optical scanning device of the present invention.

FIG. 9 illustrates an optical scanning device 100 having the plastic optical element 10.

The optical scanning device 100 scans light beams emitted from plural light sources to form electrostatic latent images according to image information. Specifically, the optical scanning device 100 includes a light source 30 emitting plural light beams according to image information; a deflecting device 20 configured to deflect the emitted light beams; plural fθ lenses 14 and plural plastic optical elements 10, which are the plastic optical element mentioned above and which are opposed to the deflecting device 20.

The plural light beams emitted from plural laser sources of the light source 30 are deflected by the deflecting device 20 (such as polygon mirrors). The deflected laser beams are focused on the surfaces of respective photoreceptors (not shown) while the photoreceptors are scanned with the laser beams, resulting in formation of electrostatic latent images on the photoreceptors.

Figure 10:
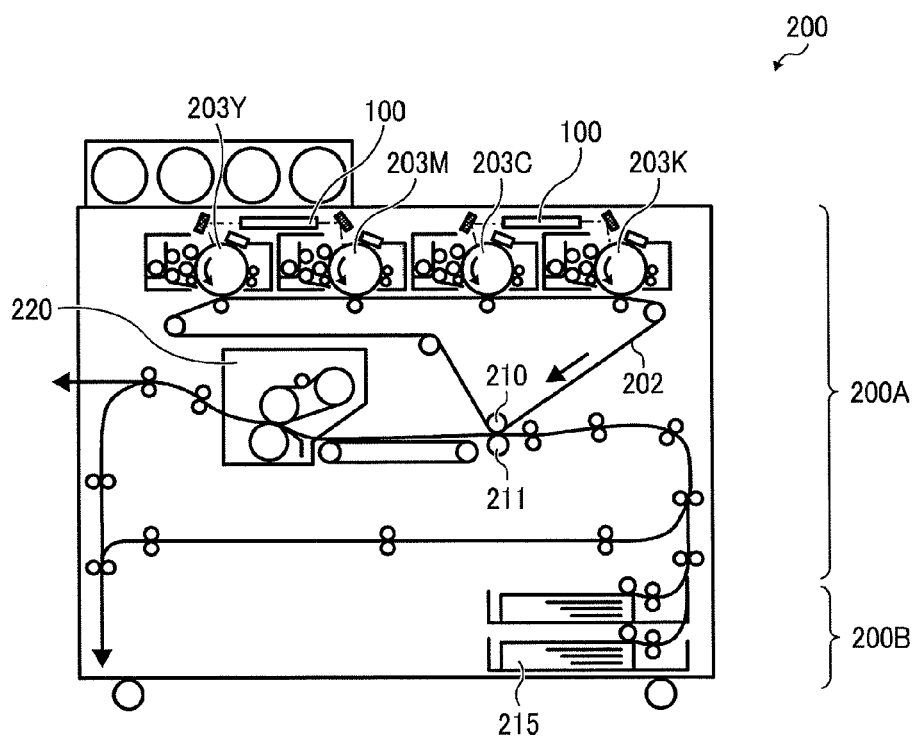
FIG. 10 is a schematic view illustrating an example of the image forming apparatus of the present invention.

FIG. 10 illustrates a tandem color copier 200, which is an example of the image forming apparatus of the present invention and which includes the above-mentioned optical scanning device of the present invention.

The color copier 200 is a high speed copier including an image forming section 200A located at the center of the copier; a receiving material feeding section 200B located below the image forming section 200A; and an image reading section (not shown) located above the image forming section 200A. The image forming section 200A includes a fixing device 220 configured to fix a visual image 8 such as toner images) on a receiving material sheet.

The image forming section 200A includes an intermediate transfer belt 202. Four image forming devices for forming different color images having complementary colors (i.e., yellow, magenta, cyan and black colors) of the colors (i.e., blue, green and red) constituting the original image and separated by the image reading section are arranged above the intermediate transfer belt 202. Specifically, four photoreceptors 203Y, 203M, 203C and 203 K configured to respectively bear yellow, magenta, cyan and black color toner images are arranged side by side along the transfer surface of the intermediate transfer belt 202.

Each of the photoreceptors 203Y, 203M, 203C and 203 K is a photoreceptor drum rotating in a direction indicated by an arrow. Around each of the photoreceptors 203, a charger configured to charge the surface of the photoreceptor; a light irradiating device configured to irradiate the charged photoreceptor with light beams to form an electrostatic latent image on the photoreceptor; a developing device configured to develop the electrostatic latent image with a developer including a color toner to form a color toner image on the photoreceptor; a primary transfer device configured to transfer the toner image on the intermediate transfer belt 202 to form a multi-color toner image, in which yellow, magenta, cyan and black color toner images are overlaid, on the intermediate transfer belt; and a cleaning device configured to clean the surface of the photoreceptor are arranged. The developing devices perform developing using different color toners, i.e., yellow, magenta, cyan and black color toners.

The intermediate transfer belt 202 loops over a driving roller and driven rollers including a roller 210, and moves in the same direction as that of the photoreceptors 203 at toner image transfer positions. The driven roller 210 and a secondary transfer roller 211 are opposed to each other to form a secondary transfer nip with the intermediate transfer belt 202 there between. The multi-color toner image formed on the intermediate transfer belt 202 is transferred to a receiving material sheet at the secondary transfer nip, wherein the receiving material sheet is fed from the receiving material feeding section 200B. The receiving material sheet bearing the multi-color toner image thereon is laterally fed to the fixing device 220 in which the multi-color toner image is fixed thereon, resulting in formation of a full color image.

The receiving material feeding section 200B includes a tray 215 in which sheets of a receiving material are contained; and a feeding mechanism configured to feed the receiving material sheets one by one to the secondary transfer nip.

The four color image forming devices perform the same image forming operation except that different color toners are used. The operation of each color image forming device is as follows.

At first, the surface of the photoreceptor 203 is charged by a charger. The light irradiating device including the scanning device 100 of the present invention irradiates the charged photoreceptor 203 with light beams modulated by image information read by the image reading section (not shown) to form an electrostatic latent image on the photoreceptor. The developing device develops the electrostatic latent image with a developer including a color toner to form a color toner image on the photoreceptor 203. The color toner images thus formed on the photoreceptors 203Y, 203M, 203C and 203K are electrostatically transferred one by one onto the intermediate transfer belt 202 (i.e., primary transfer) at the respective transfer positions by a primary transfer device (i.e., four rollers facing the photoreceptors in FIG. 10) to which a transfer bias is applied, resulting in formation of a multi-color toner image on the intermediate transfer belt.

The multi-color toner image on the intermediate transfer belt 202 is then transferred onto a receiving material sheet, which is fed from the receiving material feeding device, at the secondary transfer nip by the rollers 210 and 211. The receiving material sheet bearing the multi-color toner image thereon is then fed to the fixing device 220 so that the multi-color toner image is fixed by a combination of a fixing belt and a pressure roller.

The receiving material sheet bearing a fixed color toner image (i.e., a full color image) thereon is separated from the fixing belt and is discharged from the image forming section 200A after fed through a discharge passage. When another image is formed on the opposite side of the receiving material sheet to produce a double-side copy, the receiving material sheet bearing a fixed color toner image is returned to the secondary transfer device including the rollers 210 and 211 to receive another toner image. The toner image is also fixed to the opposite surface of the receiving material sheet by the fixing device 220, followed by discharging from the image forming section 200A.

Another plastic optical element of the present invention will be explained.

Figure 11:
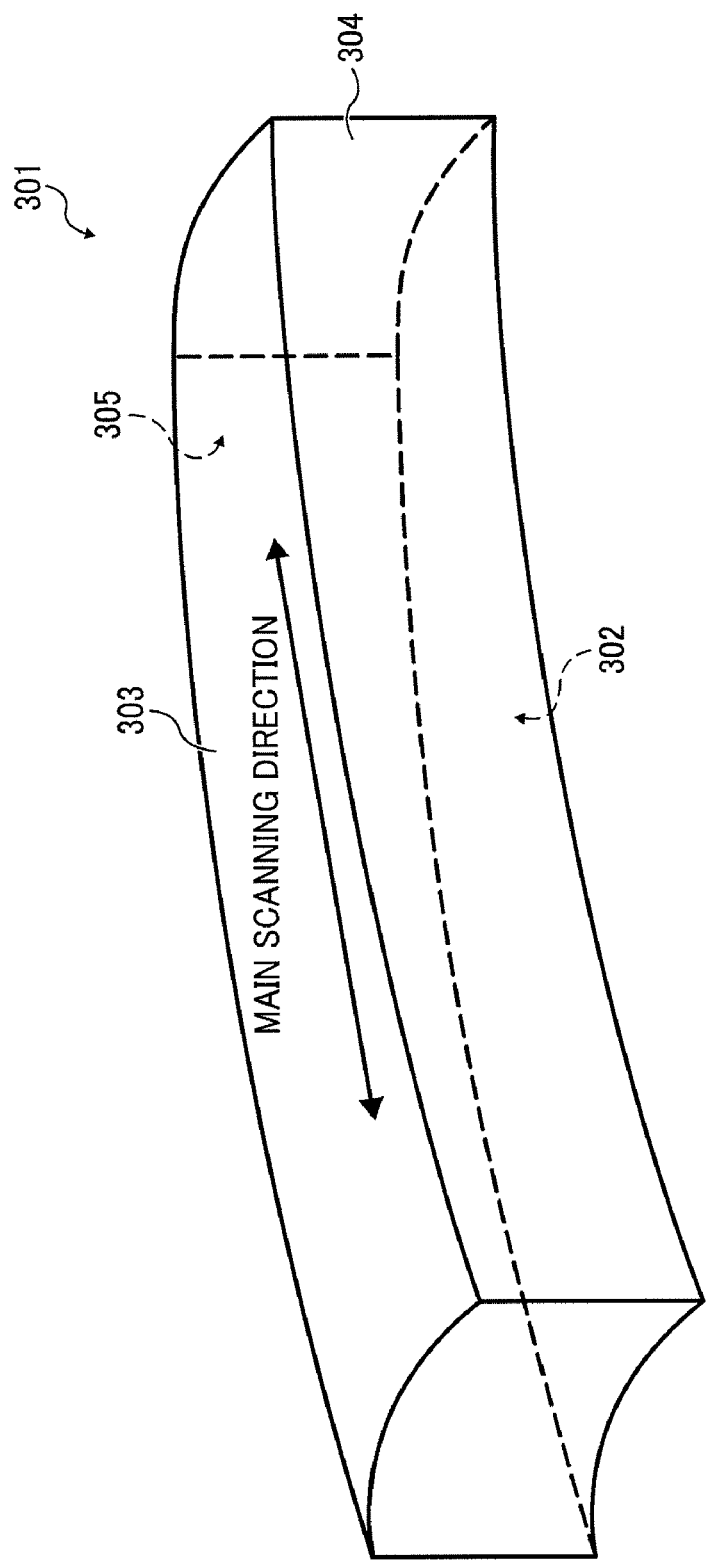
FIG. 11 is a schematic view illustrating the main body of a long plastic optical element.
Figure 12:
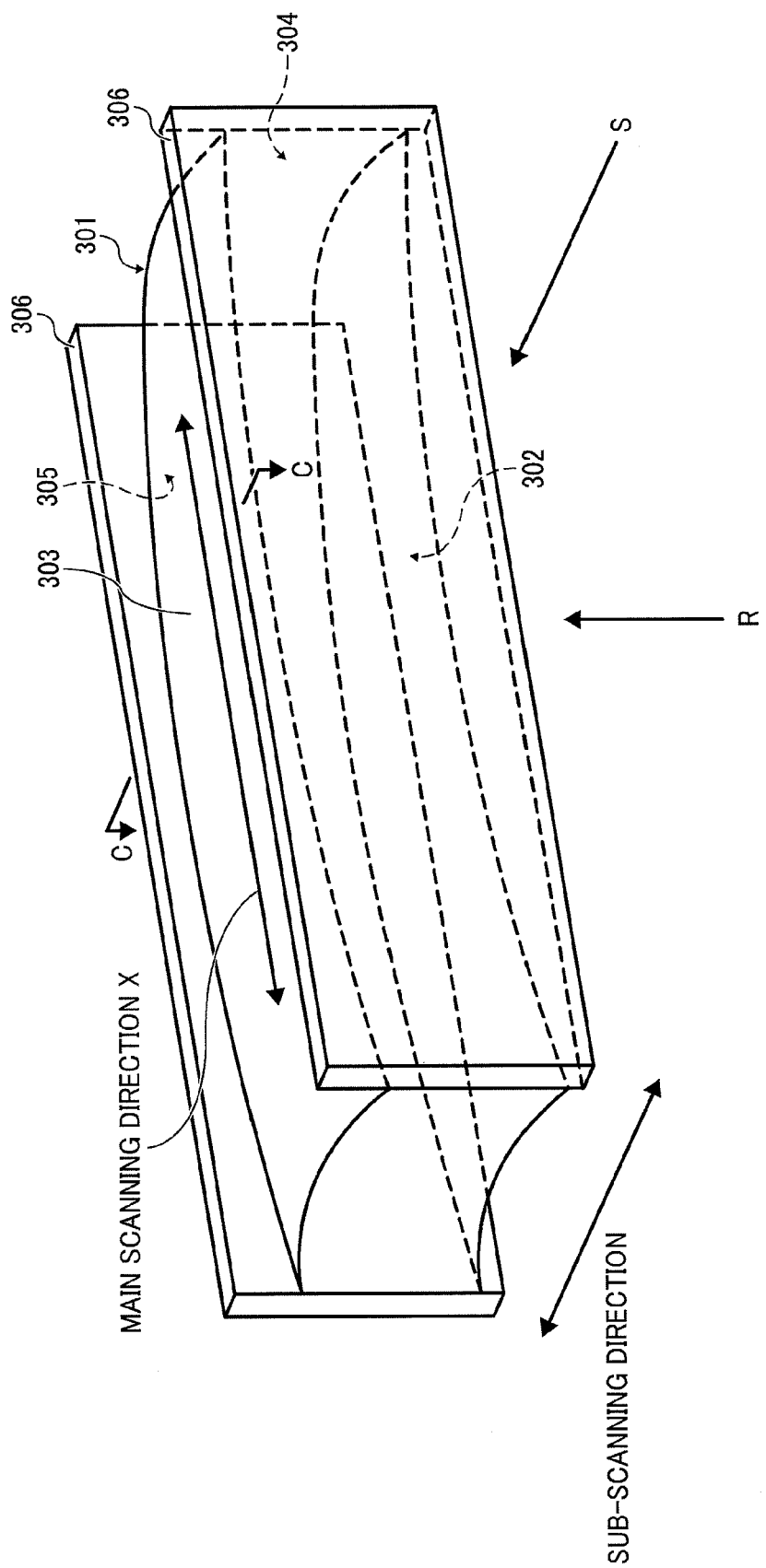
Figure 14:
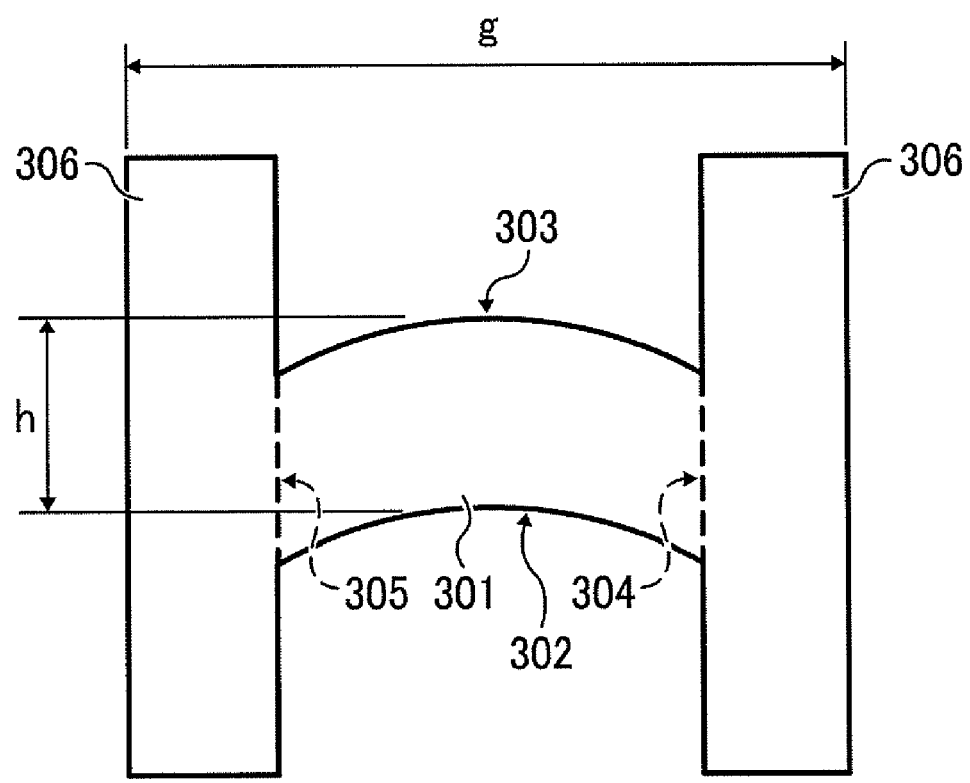
FIG. 14 is a cross section of the background long plastic optical element illustrated in FIG. 12 when the element is cut at a line C-C.

FIG. 11 illustrates the main body of a long plastic lens (i.e., a plastic optical element). FIGS. 12 and 13 illustrate the entire of a background long plastic lens having the main body illustrated in FIG. 11. FIG. 14 illustrates a cross section of the background long plastic lens when the lens is cut by a line C-C (FIG. 12). In this regard, the ratio (g/h) of the length (g) of the lens in the sub-scanning direction perpendicular to the main scanning direction (illustrated in FIG. 12) to the thickness (h) of the lens in the light transmission direction is greater than 1 as can be understood from FIG. 14.

Figure 15:
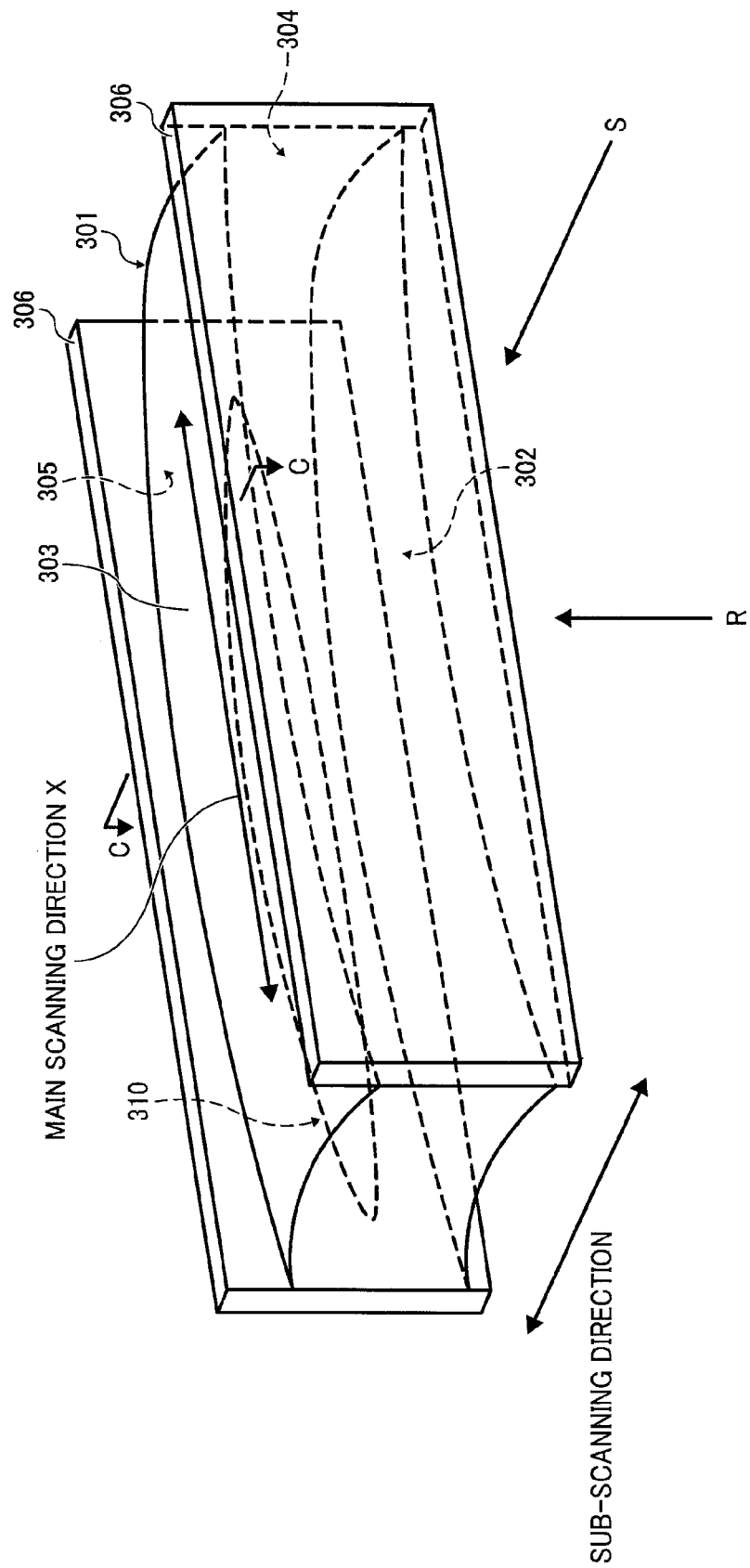
FIGS. 15 and 16 illustrate another background long plastic optical element, which has a recessed portion on a rib.
Figure 16:
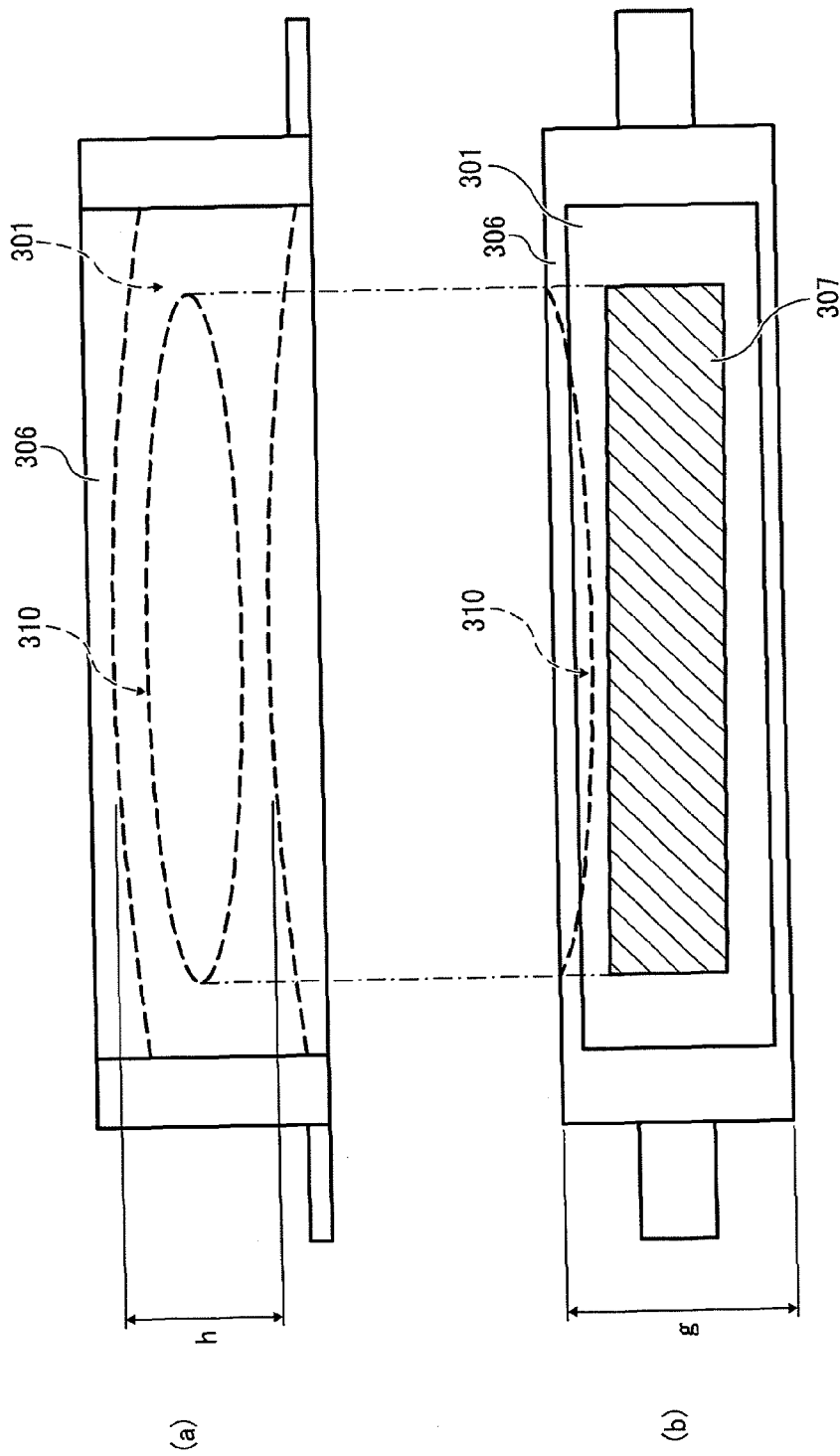
Figure 17:
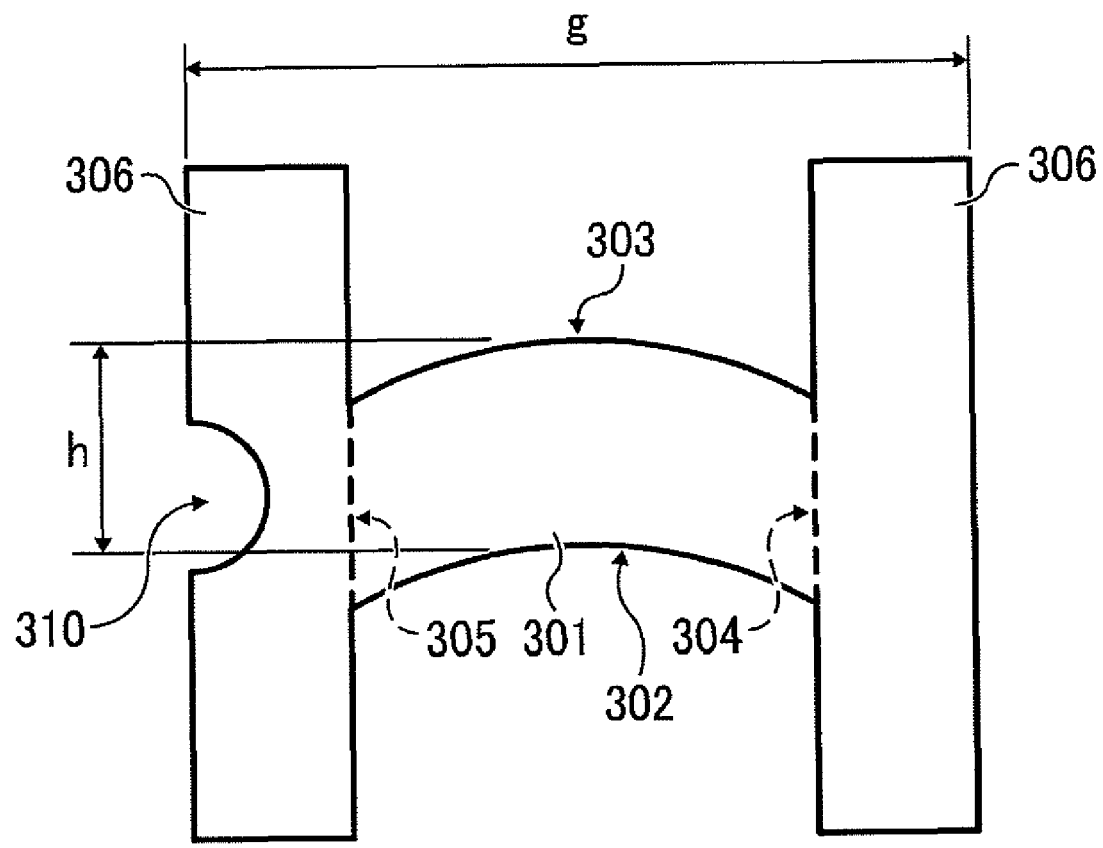
FIG. 17 is a cross section of the background long plastic optical element illustrated in FIG. 15 when the element is cut at a line C-C.

FIGS. 15-17 illustrate another background long plastic lens having a recessed-portion on one surface other than the transfer surfaces 302 and 303. In this plastic lens, a recessed portion 310 (sometimes referred to as an imperfect transfer portion) is formed on a surface of two ribs 306 of the plastic lens by imperfect transfer. This plastic lens corresponds to the plastic lens illustrated in FIG. 3 of JP-A 2000-329908.

In this regard, as illustrated in FIG. 16, the recessed portion (imperfect transfer portion) 310 extends in the longitudinal direction of the lens (i.e., in the main scanning direction) so as to correspond to a scanned-light transmission region 307. The recessed portion 310 may extend from one of the ribs 306 to the main body 301 of the lens, but it is not preferable that the recessed portion 310 invades into the light transmission region 307 of the main body 301.

Figure 18:
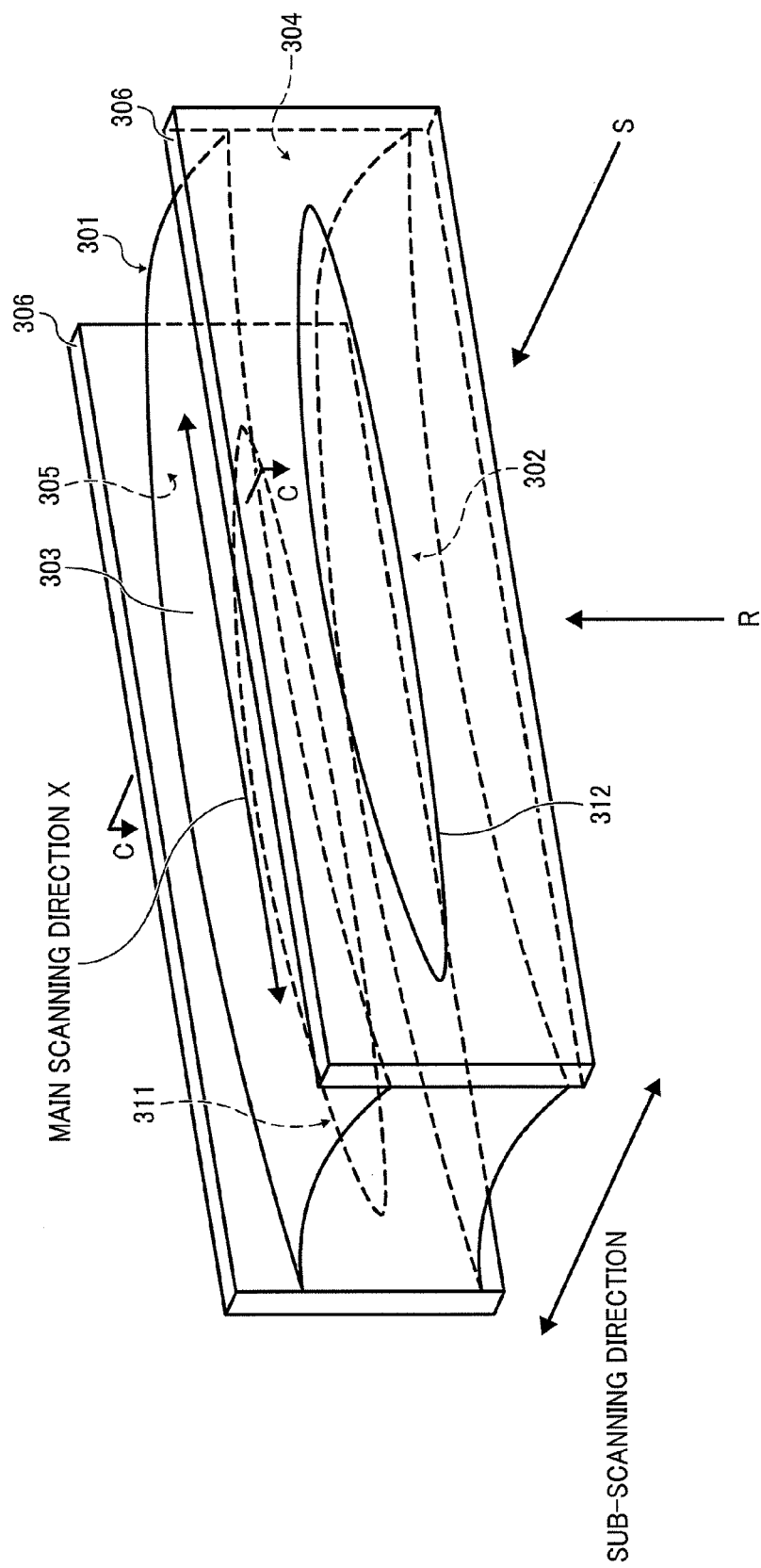
FIGS. 18 and 19 illustrate a long plastic optical element, which has two recessed portion on respective ribs.
Figure 19:
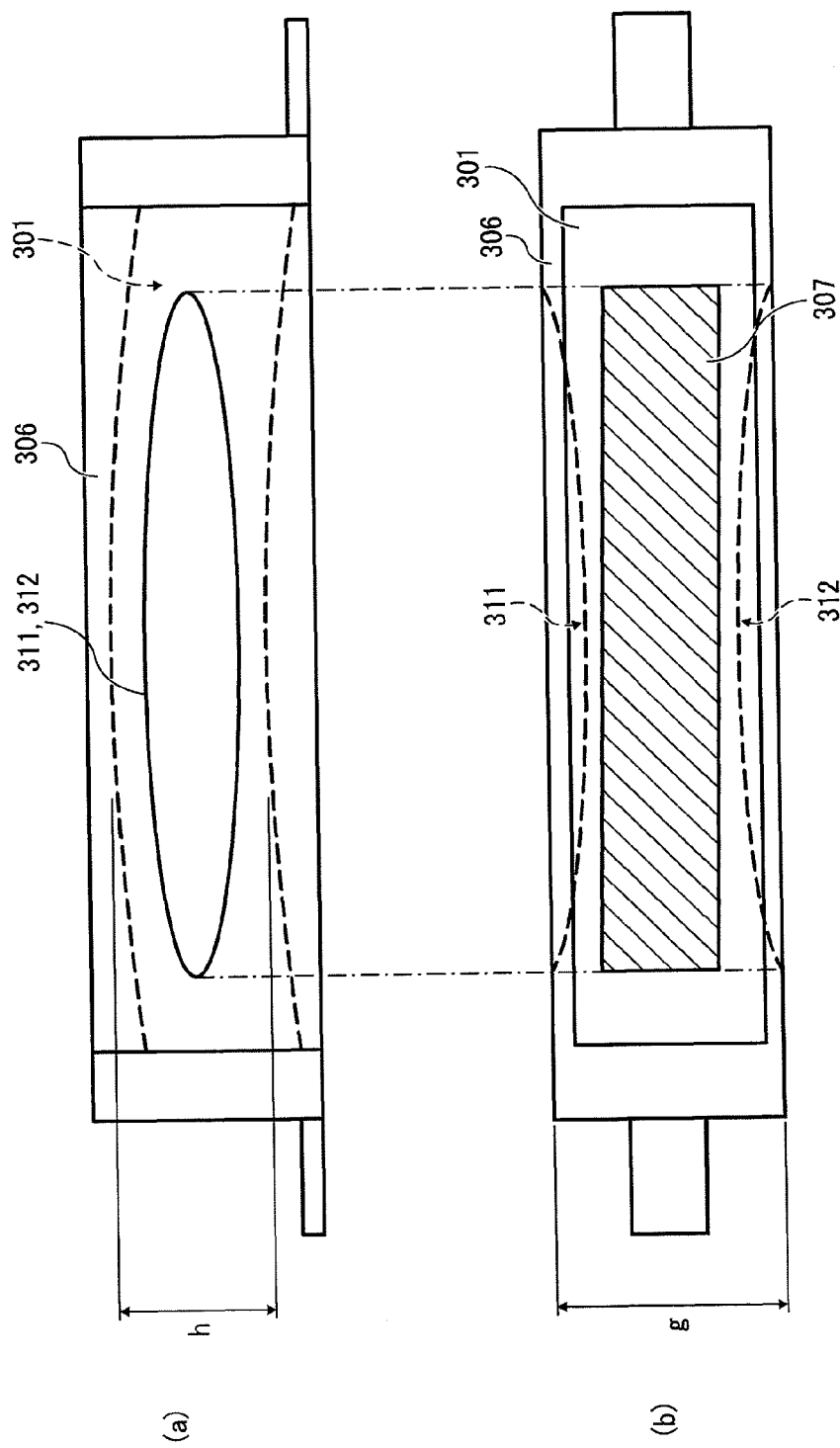
Figure 20:
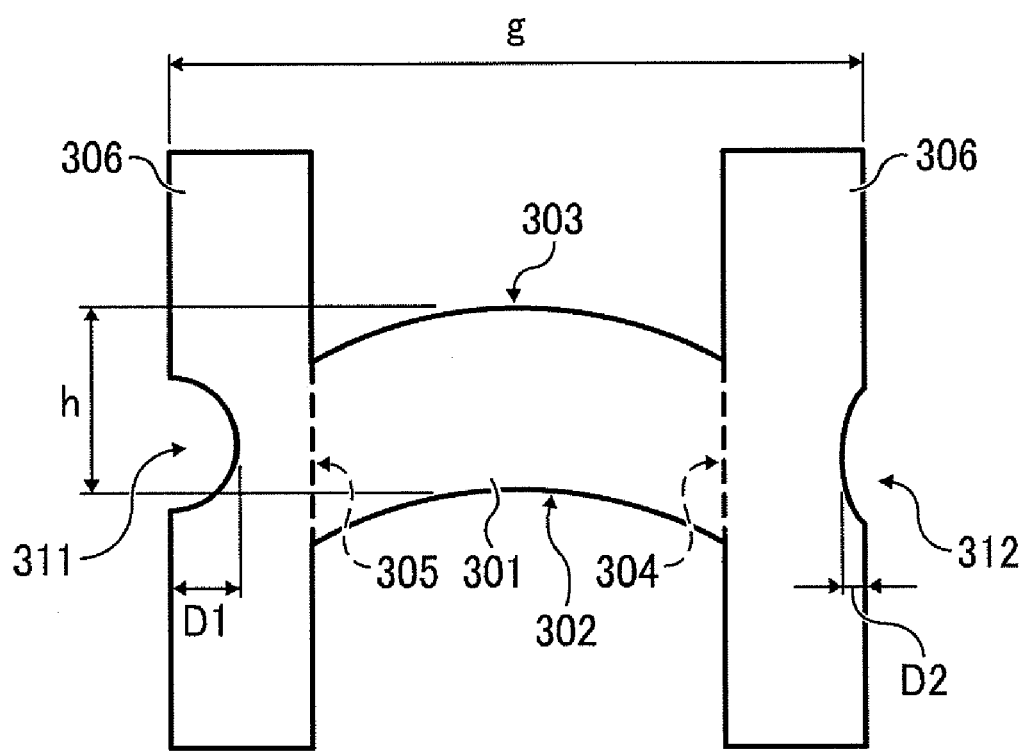
FIG. 20 is across section of the long plastic optical element illustrated in FIG. 18 when the element is cut at a line A-A.

FIGS. 18-20 illustrate a long plastic lens having two recessed portion on each of two surfaces other than transfer surfaces 302 and 303. In this plastic lens, the long plastic lens satisfies the relationship of g/h>1, and recessed portions 311 and 312 are formed on two surfaces of two ribs 306 of the plastic lens by imperfect transferring. FIG. 20 illustrates the cross section of the plastic lens obtained by cutting the lens at the line C-C as illustrated in FIG. 18. This plastic lens corresponds to the plastic lens illustrated in FIG. 4 of JP-A 2000-329908.

Referring to FIG. 19, the recessed portions 311 and 312 extend in the main scanning direction so as to correspond to the scanned-light transmission region 307. The recessed portions 311 and 312 may extend from the ribs 306 to the main body 301 of the lens (i.e., in the sub-scanning direction), but it is not preferable that the recessed portions invade into the light transmission region 307 of the main body 301.

Figure 21:
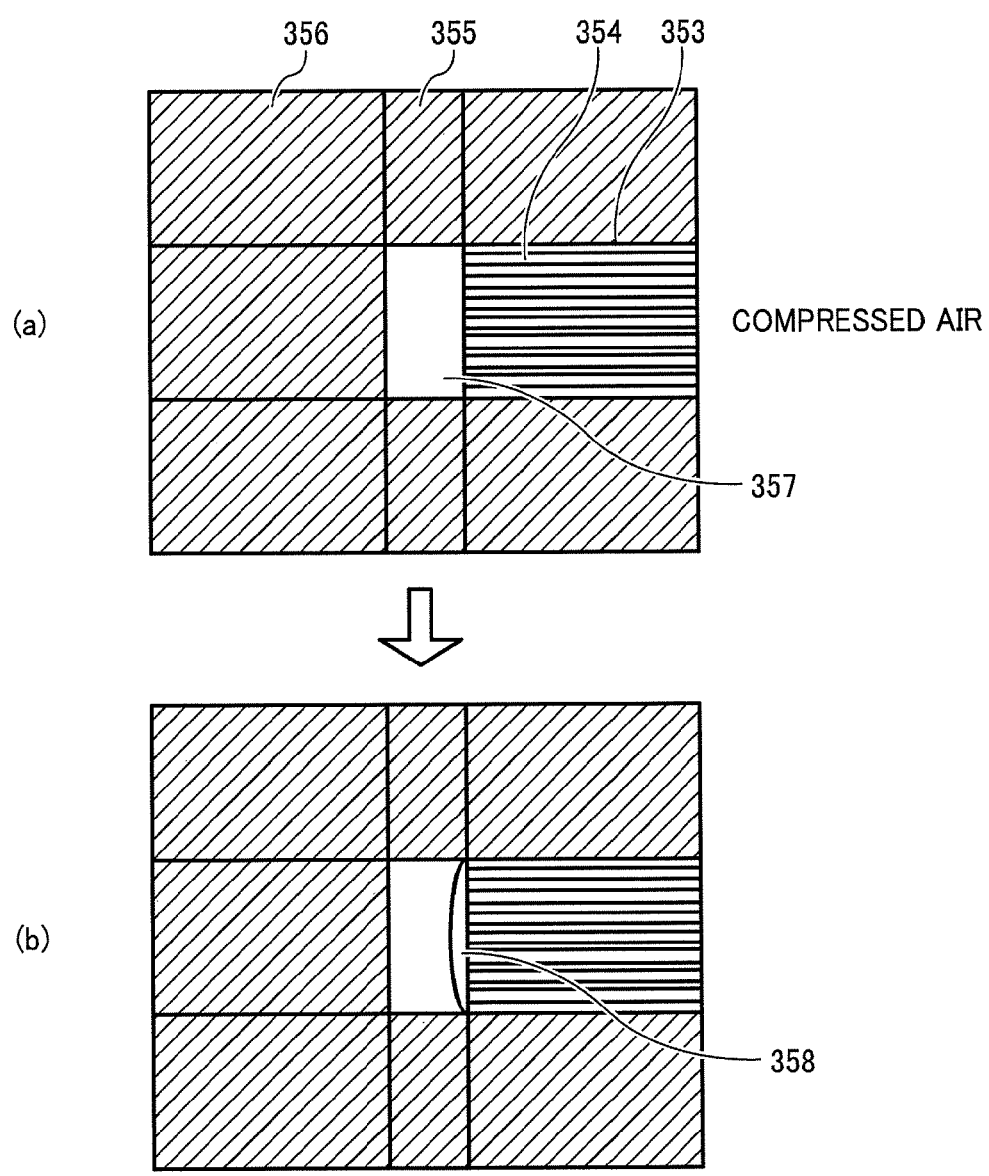
FIG. 21 is a view for explaining a method by which the long plastic optical element illustrated in FIG. 15 is prepared.

FIG. 21 is a view for explaining a first method for forming a recessed portion (i.e., an imperfect transfer surface) on a long plastic lens using compressed air.

Specifically, the first method uses a die including plural cavity pieces 356, and transfer surfaces 355 of the plural cavity pieces 356 forming a cavity. In addition, the die includes a cavity piece 353 having at least one air hole 354, through which compressed air is applied to an injected resin 357 to form a recessed portion on a surface of the injected resin by imperfect transferring. The air hole 354 is connected with at least one communicating tube connected with a compressed air supplying device (not shown) located on the outside of the die. The die is heated to a temperature of lower than the softening point of the resin used for molding. The resin heated to a temperature of not lower than the softening point thereof is injected into the die such that the injected resin is pressure-contacted with the transfer surfaces 355, followed by cooling the resin to a temperature lower than the softening point thereof while applying compressed air to the resin in the cavity of the die through the air hole 354, thereby forming an air space 358 between the surface of the cavity piece 353 and the surface of the resin, resulting in formation of a recessed portion on the surface of the molded resin.

Since the air space 358 is formed between the resin and the cavity piece 353, the surface of the resin facing the cavity piece 353 becomes a free surface. Therefore, the surface can move relatively easily compared to other surfaces contacted with the cavity pieces 356 (i.e., the transfer surfaces 355). Therefore, the heat shrinkage of the resin due to cooling can be absorbed by the movement of the surface portion having the free surface. Accordingly, the surface portion having the free surface sinks by priority. Therefore, the internal strain of the resin is relaxed, and in addition occurrence of a problem in that a sink is formed on one or more of the transfer surfaces of the molded resin can be prevented.

Figure 22:
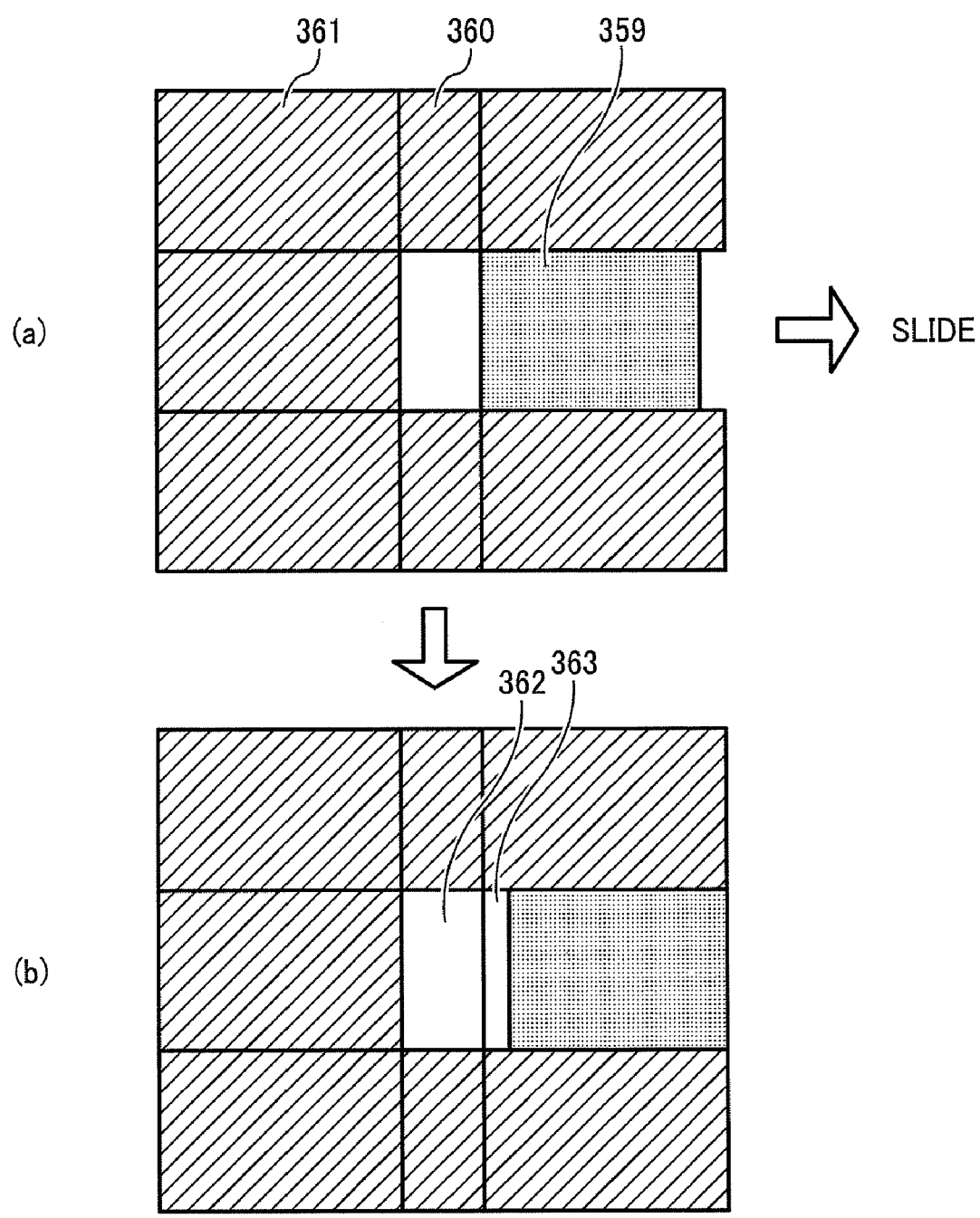
FIG. 22 is a view for explaining another method by which the long plastic optical element illustrated in FIG. 15 is prepared.

FIG. 22 is a view for explaining a second method for forming a recessed portion (i.e., an imperfect transfer surface) on the long plastic lens using a slidable cavity piece.

Specifically, referring to FIG. 22, the second method uses a die including plural cavity pieces 361, and transfer surfaces 360 of the plural cavity pieces 361 forming a cavity. In addition, the die includes a slidable cavity piece 359 for forming a recessed portion. The die is heated to a temperature of lower than the softening point of the resin used for molding. A resin 362, which is heated to a temperature of not lower than the softening point thereof and thereby melted, is injected into the die such that the injected resin is pressure-contacted with the transfer surfaces 360, followed by cooling the resin to a temperature lower than the softening point thereof while sliding the slidable cavity piece 359 in a direction indicated by an arrow (i.e., in such a direction that the piece 359 is apart from the resin), thereby forming an air space 363 between the surface of the slidable cavity piece 359 and the surface of the injected resin, resulting in formation of a recessed portion on the surface of the molded resin.

Since the air space 363 is formed between the resin and the cavity piece 359, the surface of the resin facing the cavity piece 359 becomes a free surface. Therefore, the surface can move relatively easily compared to other surfaces contacted with the cavity pieces 361 (i.e., the transfer surfaces 360). Therefore, the heat shrinkage of the resin due to cooling can be absorbed by the movement of the surface portion having the free surface. Accordingly, the surface portion having the free surface sinks by priority. Therefore, the internal strain of the resin is relaxed, and in addition occurrence of a problem in that a sink is formed on one or more of the transfer surfaces of the molded resin can be prevented.

Thus, by forming a recessed portion, which is an imperfect transfer surface, on one surface of the molded plastic lens other than the transfer surfaces thereof, the plastic lens can be prevented from having a defective appearance. In addition, by forming a recessed portion, which is an imperfect transfer surface, on each of two surfaces of the molded plastic lens other than the transfer surfaces thereof as illustrated in FIGS. 18-20, the defective appearance preventing effect can be further enhanced.

However, since the thickness (g) of the plastic lenses illustrated in FIGS. 15 and 18 is smaller than the length (h) of the lens in the sub-scanning direction, a problem in that the transfer surfaces 302 and 303 are slanted in the sub-scanning direction, resulting in deterioration of precision of the lens occurs depending on the conditions of the recessed portions. When the degree of slanting of the transfer surface 303 varies in the main scanning direction depending on the conditions of the formed recessed portions, a distortion problem in that the lens is distorted in the sub-scanning direction occurs.

The present inventors analyze the distortion problem. As a result of the analysis, the present inventors discover the mechanism of the distortion. Specifically, the present inventors consider that since formation of a recessed portion is caused by thermal shrinkage of the resin, the depth of the recessed portion is proportional to the amount of shrinkage. Therefore, depending on the conditions of the recessed portions (heat shrinkage), the dimension of the lens varies, resulting in slanting of the transfer surfaces 302 and 303. When the degree of slanting varies in the main scanning direction, the distortion problem occurs. When such a distorted plastic lens is used for an optical scanning device, the positions of the scanned light spots vary in the sub-scanning direction, particularly, the scanning position of high frequency component in an optical scanning device seriously vary, resulting in formation of misalignment of dot color images in a color image forming apparatus using the optical scanning device. In this regard, the high frequency component means the residual component determined by subtracting the secondary component from the scanning position, and is an important factor in the qualities (such as color misalignment) of color images.

Figure 23:
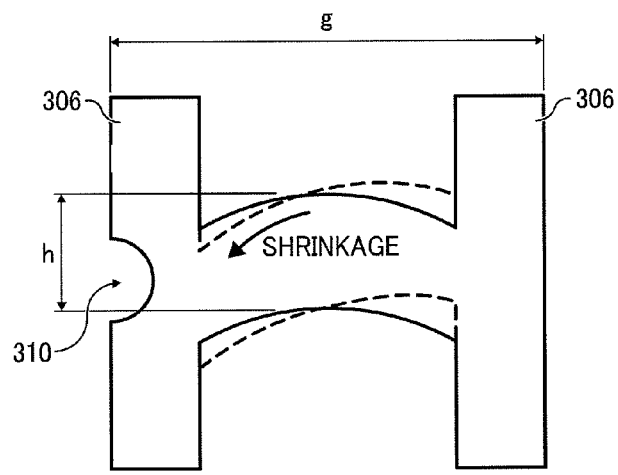
FIG. 23 is a view for explaining change of dimension of the long plastic optical element illustrated in FIG. 15 caused when one recessed portion is formed by imperfect transferring.
Figure 24:
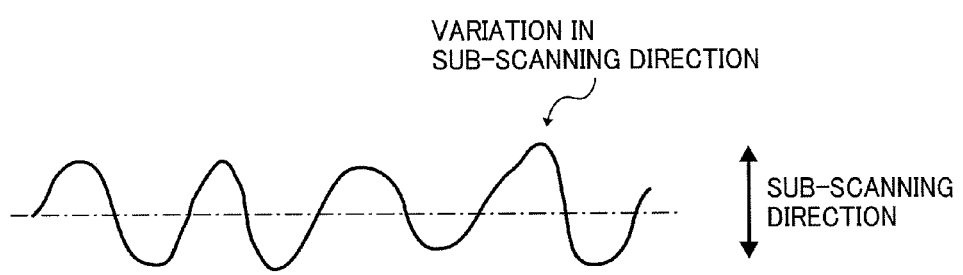
FIG. 24 is a view for explaining positional variation of light spots formed by a deformed (twisted) plastic optical lens.

In a plastic lens having a recessed portion on the surface of one of the ribs 306 as illustrated in FIGS. 15-17, the left side of the lens at which the recessed portion 310 is formed is dimensionally changed as illustrated by a dotted line in FIG. 23. Thereby, the plastic lens is distorted, and the positions of the scanned light spots vary in the sub-scanning direction as illustrated in FIG. 24. Particularly, the scanning positions of high frequency component in an optical scanning device seriously vary.

Figure 25:
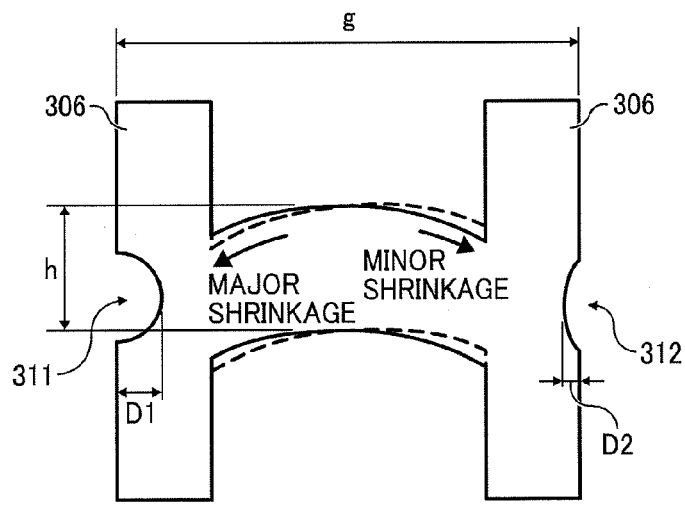
FIG. 25 is a view for explaining change of dimension of the long plastic optical element illustrated in FIG. 18 caused when two recessed portions are formed on the respective ribs by imperfect transferring.

In a plastic lens having a recessed portion on a surface of each of the ribs 306 as illustrated in FIGS. 18-20, the degree of the dimensional change (i.e., heat shrinkage) occurring in the recessed portion forming process is different on the right and left sides of the ribs 306 as illustrated in FIG. 25 if the depths (D1 and D2) of the recessed portions 311 and 312 are largely different. In this case, the plastic lens is distorted, and the positions of the scanned light spots vary in the sub-scanning direction as illustrated in FIG. 24 similarly to the case mentioned above. Particularly, the scanning positions of high frequency component in an optical scanning device seriously vary, resulting in formation of misalignment of dot color images in a color image forming apparatus using the optical scanning device.

Although the degree of distortion of the lens having a recessed portion on the surface of each of the ribs 306 as illustrated in FIGS. 18-20 is relatively small compared to that of the lens having a recessed portion on the surface of one of the ribs 306 as illustrated in FIGS. 15-17, the distortion becomes remarkable when the difference between the depths D1 and D2 increases.

Figure 26:
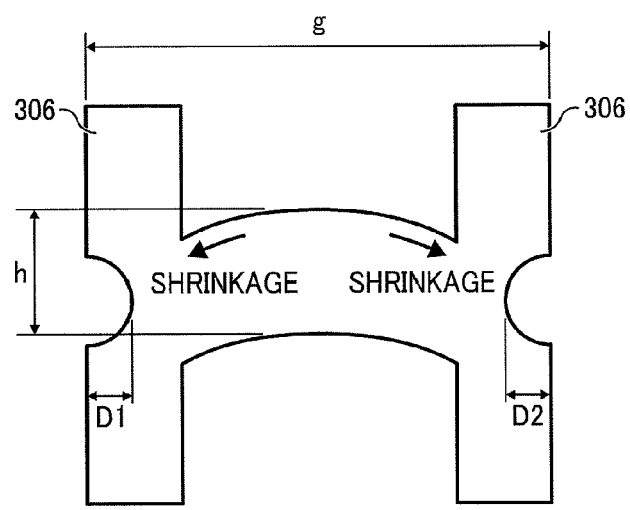
FIG. 26 is a view for explaining change of dimension of another long plastic optical element having two well-balanced recessed portions caused when the recessed portions are formed by imperfect transferring.
Figure 27:
FIG. 27 is a view for explaining positional variation of light spots formed by the plastic optical lens illustrated in FIG. 26.

As a result of the present inventors' experiments, it is found that when the variation $|D1(x)-D2(x)|$ between the depths D1 and D2 of the recessed portions formed on both sides (ribs) of a plastic lens satisfying the relationship g/h>1 is not greater than 5% of the sub-scanning direction length (g) of the lens at any position (x) in the main scanning direction, the degree of the dimensional change (i.e., heat shrinkage) occurring in the recessed portion forming process is well balanced on the both sides of the plastic lens as illustrated in FIG. 26. Thus, by controlling the variation, distortion of the lens can be dramatically decreased. In this case, variation of position of the scanned light spots in the sub-scanning direction (particularly variation of scanning position of high frequency component) can be dramatically decreased as illustrated in FIG. 27.

The present inventors also discover that even when the sub-scanning direction length (g) of the lens is changed, the above-mentioned effect can be produced if the relationship g/h>1 is satisfied (and the variation $|D1(x)-D2(x)|$ is not greater than 5% of the sub-scanning direction length (g).

It is preferable for the recessed portions 311 and 312 to have such a form as illustrated in FIGS. 5 and 6.

Another example of the optical scanning device of the present invention will be explained.

The optical scanning device includes a light source configured to emit a light beam; a light deflector configured to deflect the light beam; and a focusing optical system configured to focus the deflected light beam on a predetermined position of a member while scanning the member with the light beam, wherein the focusing optical system includes the above-mentioned plastic lens. Specifically, the plastic lens satisfies the relationship g/h>1, wherein g represents the sub-scanning direction length of the lens, and h represents the thickness of the lens in the light transmission direction. In addition, the following relationship is satisfied at any position (x) of the plastic lens in the main scanning direction:

$$|D1(x)-D2(x)| \leq 0.05\ g,$$

wherein $D1(x)$ represents the depth of a recessed portion formed on a surface of one of the sides (ribs) of the plastic lens other than the transfer surfaces (302 and 303), $D2(x)$ represents the depth of a recessed portion formed on a surface of the other side (rib) of the plastic lens other than the transfer surfaces (302 and 303), and g represents the sub-scanning direction length of the lens.

By using the optical scanning device, variation of position of the scanned light spots in the sub-scanning direction (particularly variation of scanning position of high frequency component) can be dramatically decreased.

In this regard, the plastic lens is made from a transparent resin material. Specific examples of the resin materials include amorphous resins, whose softening point is the same as the glass transition temperature thereof, such as methacrylic resins, polycarbonate resins, alicyclic acrylic resins, cyclic polyolefin copolymers, etc.

Figure 28:
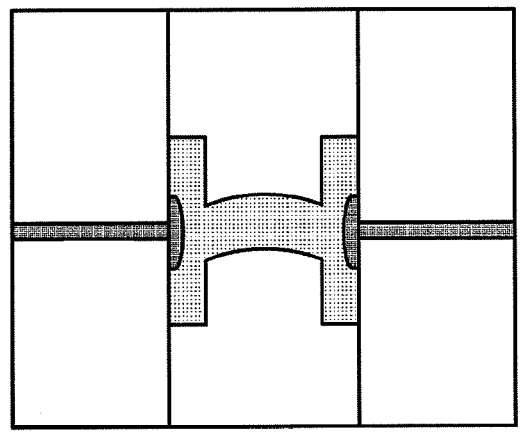
FIGS. 28-30 are views for explaining methods for preparing the long plastic optical element of the present invention having two well-balanced recessed portions.
Figure 29:
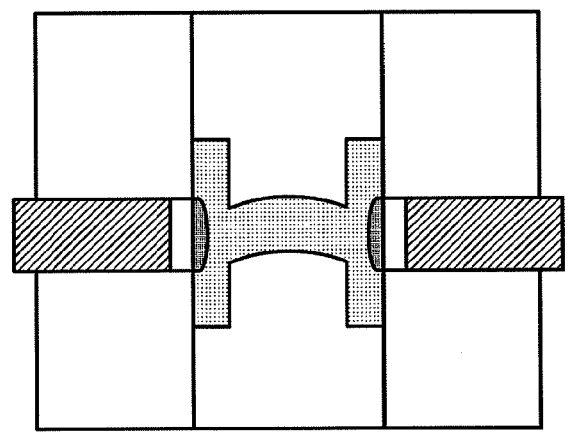
Figure 30:
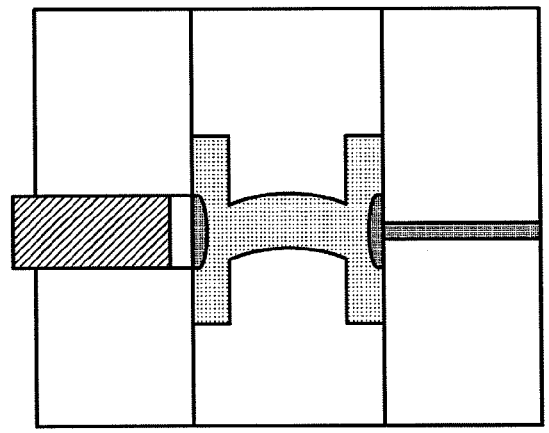

FIGS. 28-30 are views for explaining methods for forming a recessed portion (an imperfect transfer surface) on two opposed surfaces of a plastic lens other than the transfer surfaces of the lens.

In the method using a die illustrated in FIG. 28, compressed air is applied to the molded resin similar to the method using the die illustrated in FIG. 21 to form a recessed portion on both sides of the molded resin, wherein the recessed portions are caused by imperfect transferring in the molding process. In this method, in order to form a desired recessed portion on the both sides of the molded resin, it is preferable to properly control the following factors:

(1) Position of one or more slits (i.e., air hole 354 in FIG. 21);
(2) Width of the slits;
(3) Pressure of the compressed air; and
(4) Air injection timing.

In the method using a die illustrated in FIG. 29, a cavity piece is slid similar to the method using the die illustrated in FIG. 22 to form a recessed portion on both sides of the molded resin, wherein the recessed portions are caused by imperfect transferring in the molding process. In this method, in order to form a desired recessed portion on the both sides of the molded resin, it is preferable to properly control the following factors:

(1) Shape of the slidable cavity piece; and
(2) Cavity piece sliding timing.

The method using a die illustrated in FIG. 30 is a combination of the method using the die illustrated in FIG. 21 and the method using the die illustrated in FIG. 22. Specifically, compressed air is applied to one side of the molded resin, and a cavity piece is slid at the other side of the molded resin to form a recessed portion on both sides of the molded resin, wherein the recessed portions are caused by imperfect transferring in the molding process. In this method, in order to form a desired recessed portion on the both sides of the molded resin, not only the factors mentioned above but also molding conditions including the amount of injected resin are preferably controlled.

Figure 31A:
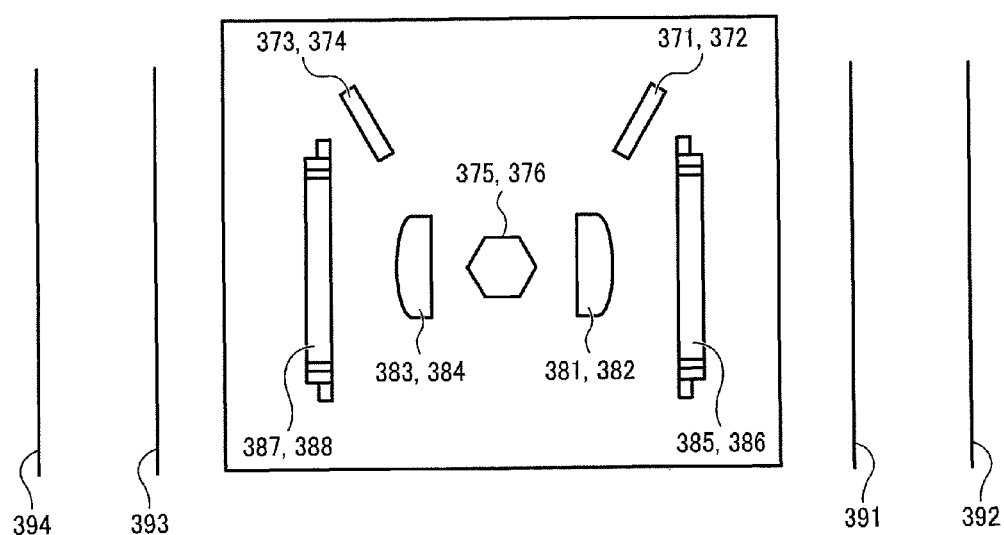
FIGS. 31A and 31B illustrate an example of the optical scanning device of the present invention.
Figure 31B:
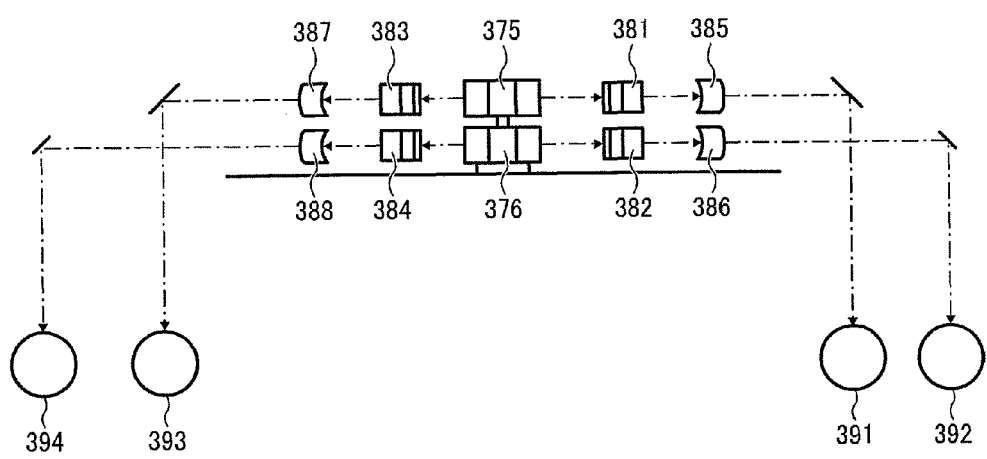

FIGS. 31A and 31B are respectively a top plan view and a side view illustrating another example of the optical scanning device of the present invention. Referring to FIGS. 31A and 31B, numerals 371-374 denote light sources (i.e., laser diodes) configured to emit laser beams for forming electrostatic images corresponding to cyan (C), magenta (M), yellow (Y) and black (K) images. Numerals 375 and 376 denote light deflectors (i.e., polygon mirror, in this example) configured to deflect the laser beams emitted by the light sources 371-374. Numerals 381-384 respectively denote fθ lenses through which the respective laser beams for C, M, Y and K images pass, and numerals 385-388 respectively denote long lenses, which are the plastic optical lens of the present invention and through which the respective laser beams for C, M, Y and K images pass. In addition, numerals 391-394 denote photoreceptors, which the laser beams deflected by the deflectors scan to form thereon electrostatic latent images corresponding to C, M, Y and K images. In this regard, the fθ lenses 381-384 and the long lenses 385-388 constitute a focusing optical system configured to focus light beams on the photoreceptors.

In the optical scanning device illustrated in FIG. 31, the laser beams for C, M, Y and K images emitted by the light sources 371-374 are deflected by the deflectors 375 and 376 so as to enter the focusing system including the fθ lenses 381-384 and the long lenses 385-388. The laser beams are then focused on the surfaces of the photoreceptors 391-394 via mirrors, thereby forming electrostatic latent images (corresponding to C, M, Y and K images) on the photoreceptors 391-394.

The above-mentioned long plastic lens of the present invention is used for the long lenses 385-388, and therefore light spots can be formed on the photoreceptors 391-394 with little positional variation in the sub-scanning direction. As mentioned above, the plastic lens of the present invention is used for improving variation of scanning positions of high frequency components.

The optical scanning device illustrated in FIG. 31 is preferably used for an image forming apparatus, particularly, for a color image forming apparatus. In this case, since positional variation of light spots in the sub-scanning direction is improved (particularly, variation of scanning positions of high frequency components is improved), the image forming apparatus can produce high quality color images with little color misalignment.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2008-223630 and 2009-016169, filed on Sep. 1, 2008, and Jan. 28, 2009, respectively, the entire contents of which are here in incorporated by reference.

What is claimed is:

1. A plastic optical element for guiding a scanned light beam in a main scanning direction and a sub-scanning direction, which is prepared by a molding method using a die, comprising:
   a main body including at least two optically functional surfaces, which are transfer surfaces formed by contact with transfer surfaces of the die and which include:
      a light entrance surface from which the light beam enters; and
      a light exit surface from which the light beam exits; and
   at least two ribs located on surfaces of the main body other than the at least two optically functional surfaces and extending in parallel in a longitudinal direction of the main body corresponding to the main scanning direction,
   wherein a recessed portion is present on a surface of at least one of the at least two ribs, the recessed portion has a side surface, which is a transfer surface, and a bottom surface, which is a non-transfer surface formed without contact with the transfer surfaces of the die, wherein a distance between the at least two optically functional surfaces of the main body is less than a length of the main body in the sub-scanning direction.

2. The plastic optical element according to claim 1, wherein the side surface of the recessed portion has a draft angle in such a direction that the recessed portion broadens out from the bottom surface toward a top of the recessed portion.

3. The plastic optical element according to claim 1, wherein the plastic optical element is made of a transparent resin.

4. The plastic optical element according to claim 3, wherein the recessed portion has a depth that causes a shrinking force generated on the bottom surface to decrease a releasing force of the resin such that the releasing force is less than a transfer force of the resin.

5. The plastic optical element according to claim 1, wherein the plastic optical element has two ribs, and the recessed portion is present on a surface of each of the two ribs, and wherein the plastic optical element satisfies the following relationship:

$|D1(x)-D2(x)| \leq 0.05 \text{ g}$, wherein $D1(x)$ represents a depth of the recessed portion located on a surface of one of the two ribs at a position (x) in the main scanning direction, $D2(x)$ represents a depth of the recessed portion located on a surface of the other of the two ribs at the position (x) in the main scanning direction, and g represents the length of the plastic optical element in the sub-scanning direction.

6. An optical scanning device comprising:
   a light source configured to emit a light beam;
   a light deflector configured to deflect the light beam; and
   a focusing optical system configured to focus the deflected light beam on a member while scanning the member with the deflected light beam, wherein the focusing optical system includes the plastic optical element according to claim 1.

7. The optical scanning device according to claim 6, wherein the plastic optical element has two ribs, and the recessed portion is present on a surface of each of the two ribs, and wherein the plastic optical element satisfies the following relationship:

$|D1(x)-D2(x)| \leq 0.05 \text{ g}$, wherein $D1(x)$ represents a depth of the recessed portion located on a surface of one of the two ribs at a position (x) in the main scanning direction, $D2(x)$ represents a depth of the recessed portion located on a surface of the other of the two ribs at the position (x) in the main scanning direction, and g represents the length of the plastic optical element in the sub-scanning direction.

8. An image forming apparatus comprising:
   at least one image bearing member configured to bear an electrostatic image thereon;
   the optical scanning device according to claim 6 configured to focus the light beam on the at least one image bearing member while scanning the at least one image bearing member with the light beam to form the electrostatic image on a surface of the at least one image bearing member.

9. The image forming apparatus according to claim 8, including at least two image bearing members, wherein the optical scanning device includes at least two light sources and at least two plastic optical elements to focus the light beams on the at least two image bearing members while scanning the at least two image bearing members with the respective light beams to form the electrostatic images on the surfaces of the at least two image bearing members.

10. The image forming apparatus according to claim 8, wherein the plastic optical element has two ribs, and the recessed portion is present on a surface of each of the two ribs, and wherein the plastic optical element satisfies the following relationship:

$|D1(x)-D2(x)| \leq 0.05 \text{ g}$, wherein $D1(x)$ represents a depth of the recessed portion located on a surface of one of the two ribs at a position (x) in the main scanning direction, $D2(x)$ represents a depth of the recessed portion located on a surface of the other of the two ribs at the position (x) in the main scanning direction, and g represents the length of the plastic optical element in the sub-scanning direction.

* * * * *